(12) United States Patent
Takahara et al.

(10) Patent No.: US 6,199,941 B1
(45) Date of Patent: Mar. 13, 2001

(54) IMPACT ENERGY ABSORBING STRUCTURE IN UPPER VEHICLE BODY PORTION AND IMPACT ENERGY ABSORBING MEMBER

(75) Inventors: Isamu Takahara, Nagoya; Katsumi Kato, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/294,033

(22) Filed: Apr. 19, 1999

(30) Foreign Application Priority Data

May 8, 1998 (JP) .................................. 10-126501
May 29, 1998 (JP) .................................. 10-150063
Sep. 1, 1998 (JP) .................................. 10-247170

(51) Int. Cl.⁷ ........................................ B60J 5/04
(52) U.S. Cl. ..................... 296/189; 138/121; 280/751; 188/371
(58) Field of Search ................... 296/188, 189; 293/132, 133; 138/121, 122; 280/751, 752; 188/371, 377

(56) References Cited

U.S. PATENT DOCUMENTS

| 2,897,603 | * | 8/1959 | Behrman .................................. 34/99 |
| 3,412,628 | * | 11/1968 | De Gain .................................. 74/492 |
| 3,577,621 |   | 5/1971 | DeGain . |
| 3,794,311 |   | 2/1974 | Rode . |
| 3,904,223 |   | 9/1975 | Wilfert et al. . |
| 4,531,619 |   | 7/1985 | Eckels . |
| 4,793,384 | * | 12/1988 | Lalikos et al. ...................... 138/121 |
| 4,877,224 |   | 10/1989 | Watts . |
| 4,890,877 | * | 1/1990 | Ashtiani-Zarandi et al. ........ 296/146 |
| 5,033,593 | * | 7/1991 | Kazuhito .......................... 296/189 X |
| 5,163,730 |   | 11/1992 | Welch . |
| 5,325,893 | * | 7/1994 | Takagi et al. ........................ 138/143 |
| 5,660,426 |   | 8/1997 | Sugimori et al. . |
| 5,680,886 |   | 10/1997 | Ohtsuka . |
| 5,880,394 | * | 3/1999 | Kim ................................ 296/188 X |
| 5,884,962 | * | 3/1999 | Mattingly et al. .................... 296/189 |

FOREIGN PATENT DOCUMENTS

| 42 11 964 A1 | 10/1993 | (DE) . |
| 19650647 | 4/1997 | (DE) . |
| 0 888 952 | 1/1999 | (EP) . |
| 2 317 214 | 3/1998 | (GB) . |
| 46-23533 | 8/1971 | (JP) . |
| 7-61304 | 3/1995 | (JP) . |

\* cited by examiner

Primary Examiner—Joseph D. Pape
(74) Attorney, Agent, or Firm—Oliff&Berridge, PLC

(57) ABSTRACT

An impact absorbing member is provided that can absorb impact energy in an upper vehicle body portion. The member may be provided in an interval between a vehicle body structural member and an interior trim spaced from the structural member. The energy absorbing member is a hybrid pipe having a metal foil core member and sheets laminated on opposite surfaces of the core member, each sheet being formed from a material other than metal. The core member and the sheets on the opposite surfaces of the core member are shaped so that the hybrid pipe has protruded portions and recessed portions that are contiguous in a direction of an axis of the hybrid pipe. Various configurations are provided to adjust and control energy absorbing characteristics of the energy absorbing member.

18 Claims, 31 Drawing Sheets

IMPACT ENERGY ABSORBING STRUCTURE IN UPPER VEHICLE BODY PORTION AND IMPACT ENERGY ABSORBING MEMBER

INCORPORATION BY REFERENCE

The disclosures of Japanese Patent Application Nos. HEI 10-150063 filed on May 29, 1998, HEI 10-126501 filed on May 8, 1998 and HEI 10-247170 filed on Sep. 1, 1998, including the specifications, drawings and abstracts are incorporated herein by reference in their entirety.

BACKGROUND OF THE INVENTION

1. Field of the Invention

The present invention relates to an impact energy absorbing structure formed in an upper portion of a body of a motor vehicle and an impact energy absorbing member. More particularly, the invention relates to a structure and a member for absorbing impact energy in an upper vehicle body portion including a vehicle body structural member, such as a pillar, a roof side rail, a header or the like, and an interior trim, such as a pillar garnish, a roof lining or the like, that is spaced from the structural member by an interval extending toward the interior of a passenger compartment, and an energy absorbing member disposed within the interval.

2. Description of the Related Art

In motor vehicles, particularly passenger cars, an energy absorbing member is disposed in an interval space between an interior trim and a structural member of a vehicle body. Therefore, if an impact load is applied in a direction from the interior trim to the structural member, the energy absorbing member deforms to absorb energy of the impact load. Normally employed energy absorbing members are, for example, a grid rib member, a urethane pad, a steel member formed by bending a thin steel sheet so as to have a hat-like sectional shape, and the like. Also employed as an energy absorbing member is a generally-termed hybrid pipe (as described in U.S. Pat. No. 5,680,886) that is made up of a metal foil core member and sheets of a material other than metal that are laid on opposite side surfaces of the core member. In the hybrid pipe, the core member and the sheets on the opposite side surfaces of the core member are corrugated so that ridges (protruded portions) and grooves (recessed portions) alternate in a direction of an axis of the pipe.

The hybrid pipe, being hollow, has various excellent properties as an energy absorbing member. That is, the hollow hybrid pipe is light-weight, and easy to shape into a desired sectional shape. Furthermore, it is possible to adjust the load-displacement energy absorbing characteristic of a hybrid pipe by changing the pitch between adjacent protruded portions (recessed portions).

SUMMARY OF THE INVENTION

Accordingly, it is an object of the present invention to provide an impact energy absorbing structure and an impact energy absorbing member that further improve the energy absorbing characteristics of a hybrid pipe.

The structure of the invention absorbs impact energy in an upper vehicle body portion including a vehicle body structure member, an interior trim spaced from the structure member by an interval extending inward from the structure member, and an energy absorbing member disposed in the interval.

In accordance with a first aspect of the invention, the energy absorbing member is a hybrid pipe having a metal foil core member and sheets laminated on opposite surfaces of the core member, each sheet being formed from a material other than metal. The core member and the sheets on the opposite surfaces of the core member are shaped so that the hybrid pipe has protruded portions and recessed portions that are contiguous in a direction of an axis of the hybrid pipe. At least one of an outer peripheral surface of the hybrid pipe and an inner peripheral surface of the hybrid pipe is at least partially coated with an adhesive coating material.

The hybrid pipe has the property of elongating in the direction of the axis thereof and reducing in the apparent plate thickness thereof when the hybrid pipe is compressed in a direction intersecting the axis. However, in the portion of the outer and/or inner peripheral surfaces of the hybrid pipe coated with the adhesive coating material, the resistance against the axial elongation of the hybrid pipe caused by compression is increased, so that the apparent plate thickness in the coated portion remains substantially the same as the original apparent plate thickness after the hybrid pipe is compressed. Furthermore, the duration during which the apparent plate thickness of the hybrid pipe is maintained if an impact load occurs on the hybrid pipe in a direction intersecting the axis of the hybrid pipe is relatively long. Therefore, energy absorbing characteristics with a sharp rising of load can be achieved.

Since the hybrid pipe retains substantially constant apparent plate thickness if compressed in directions intersecting the axis of the hybrid pipe, the hybrid pipe achieves energy absorbing characteristics with a sharp rising of load. Therefore, the impact energy absorbing structure can be locally optimized without a need to change the material or sectional shape of the hybrid pipe. Furthermore, the hybrid pipe is easy to bend, so that the hybrid pipe can easily be disposed so as to substantially conform to the shape of the structure member or the interior trim.

In accordance with a second aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe. At least one of an outer peripheral surface of the hybrid pipe and an inner peripheral surface of the hybrid pipe is partially coated with an adhesive coating material in accordance with a predetermined energy absorbing characteristic.

The energy absorbing characteristics of the hybrid pipe can be adjusted locally or entirely depending on whether the coating material is provided. The hybrid pipe may possibly receive moisture due to condensation, for example, if the hybrid pipe is disposed between a pillar and a pillar garnish or between a roof side rail and a roof lining. If the hybrid pipe is made up of a metal foil core member and sheets made of paper, a paper sheet of the hybrid pipe swells upon deposition of condensed water. It has been found that repeated cycles of swelling and drying of the paper sheet of a hybrid pipe reduces the proof stress of the hybrid pipe by about 5–10%. Such a proof stress reduction can be prevented by the coating material. If moisture occurring in a recessed portion of the hybrid pipe freezes in cold weather, the volume expansion involved in water freezing forces the hybrid pipe to elongate in the direction of the axis, so that the apparent plate thickness of the hybrid pipe reduces, resulting in energy absorbing characteristics with a gentle rising of load. Occurrence of such energy absorbing characteristics with a gentle rising of load can be prevented by the coating material. A coating material layer provided for this purpose may be thin, unlike a coating material layer provided for achieving energy absorbing characteristics with a sharp rising of load.

In the first and second aspects of the invention, a layer thickness of the coating material is partially varied in accordance with a predetermined energy absorbing characteristic.

By increasing the layer thickness of the coating material, energy absorbing characteristics with a sharper rising of load can be achieved. Therefore, by selecting a layer thickness of the coating material for each site so as to achieve predetermined energy absorbing characteristics, optimal energy absorbing characteristics can be achieved in accordance with individual sites where energy is to be absorbed.

The core member may be formed from one of an aluminum foil, a stainless steel foil and a magnesium alloy foil, and the sheets may be formed from paper. The coating material may be made of a resin selected from a group at least consisting of acrylic resins and epoxy resins, and the coating material may be provided on the outer peripheral surface of the hybrid pipe.

By using a metal foil core member and paper sheets, a flexible hybrid pipe can be produced at low costs. Therefore, the hybrid pipe can easily be disposed so as to substantially conform to the shape of a portion where energy absorption is desired. Furthermore, a desired energy absorbing characteristic can be achieved simply by coating the outer peripheral surface of the hybrid pipe with the resin coating material. Therefore, the aforementioned proof stress reduction caused by deposition of moisture and the occurrence of dull energy absorbing characteristics caused by icing can be substantially prevented.

In the first and second aspect of the invention, the structural member may be formed by a pillar and a roof side rail, and the coating material may be provided on the hybrid pipe so that the coating material is positioned at an intersecting portion between the pillar and the roof side rail.

The interval between a structure member and an interior trim is less and therefore the effective distance for energy absorption is less at the intersecting portion between the pillar, such as a front pillar, a center pillar or quarter pillar, and the roof side rail, than at the front pillar and the roof side rail. If the coating material on the hybrid pipe is position at the intersecting portion, energy absorbing characteristics with a sharp rising of load can be achieved. Therefore, impact energy can effectively absorbed even at an intersecting portion with a small effective distance.

In accordance with a third aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe. The hybrid pipe has been bent so as to substantially conform to a shape of the structural member. The hybrid pipe has been subjected to one of a strengthening process of a small-curvature portion of a bent portion of the hybrid pipe and a weakening process of a large-curvature portion of the bent portion of hybrid pipe.

If the hybrid pipe is bent, the protrusion (recess) pitch of the hybrid pipe increases at a small-curvature site in a bent portion, that is, an outer side of the bent portion, so that the small-curvature portion reduces in apparent plate thickness and becomes soft. On the other hand, at a large curvature site in the bent portion, that is, the inner side thereof, the protrusion pitch reduces, so that the large curvature portion expands in apparent plate thickness and becomes hard. By strengthening the small-curvature portion or weakening the large-curvature portion, the hardness difference between the small-curvature portion and the large-curvature portion is reduced, so that the entire bent portion can perform substantially uniform energy absorption.

In the third aspect of the invention, the small-curvature portion may be coated with an adhesive coating material.

If an impact load occurs on a bent portion, the small-curvature portion coated with the coating material is restrained from elongating in the directions of the axis of the hybrid pipe. As a result, substantially the same effect as increasing the apparent plate thickness can be achieved. In this manner, energy absorbing characteristics can easily be adjusted simply by coating a small-curvature portion with the coating material.

If a small-curvature portion of the hybrid pipe is coated with the adhesive coating material, the large-curvature portion may have at least one slit.

If an impact load occurs on a bent portion of the hybrid pipe, the small-curvature portion coated with the coating material is restrained from elongating in the directions of the axis of the hybrid pipe, thus achieving substantially the same effect as achieved by increasing the apparent plate thickness. The large-curvature portion having a slit is reduced in strength, thus achieving substantially the same effect as achieved by reducing the apparent plate thickness. Therefore, the entire bent portion of the hybrid pipe is allowed to perform substantially uniform energy absorption, simply by coating the small-curvature portion and forming a slit in the large-curvature portion. Consequently, appropriate energy absorbing characteristics can be achieved.

In accordance with a fourth aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe. At least one of an outer peripheral surface of the hybrid pipe and an inner peripheral surface of the hybrid pipe has a plurality of portions that are coated with an adhesive coating material and that are spaced by a predetermined interval in the direction of the axis of the hybrid pipe.

In the above-described hybrid pipe, the hard portions coated with the coating material and the soft portions not coated with a coating material alternate in the directions of the axis of the hybrid pipe. If an impact load occurs on the hybrid pipe in a direction intersecting the axis of the hybrid pipe, elongation of the hybrid pipe in the directions of the axis is restrained by the hard portions, so that the hybrid pipe is compressed within a limited range. Therefore, another portion of the hybrid pipe adjacent to the compressed range undergoes substantially no compression deformation. Consequently, if an impact load occurs on an arbitrary portion of the hybrid pipe and another impact subsequently occurs on a portion different from the first portion, the second portion of the hybrid pipe absorbs energy with the initial or designed performance.

In the fourth aspect of the invention, a slit is formed at one or both of a boundary between a portion of the hybrid pipe coated with the coating material and a portion of the hybrid pipe not coated with the coating material and a boundary between a portion of the hybrid pipe coated with the coating material to one thickness and a portion of the hybrid pipe coated with the coating material to another thickness that is different from said one thickness.

A slit formed at a boundary between a soft portion and a hard portion of the hybrid pipe reduces the strength of the hybrid pipe, so that the transmission of a force caused by compression deformation to elongate the hybrid pipe in the directions of the axis is reduced. As a result, the initial performance of a portion different from a portion that is initially compressed can be more easily maintained.

The hybrid pipe may be a generally prism pipe having a polygonal sectional shape, and the at least one slit may be formed in a generally flat face portion apart from a corner portion of the hybrid pipe.

Being a prism pipe having a polygonal sectional shape, the hybrid pipe can easily be mounted to a structure member or an interior trim by using a flat face portion of the pipe. Furthermore, since the slit is formed in the flat face portion apart from a corner portion of the pipe, it becomes possible to restrain elongation of the pipe in the directions of the axis thereof caused by compression deformation and restrain propagation of compression deformation without extremely reducing the strength of the hybrid pipe.

In accordance with a fifth aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of a periphery of the hybrid pipe and a direction of an axis of the hybrid pipe. At least one of an outer peripheral surface of an intermediate portion of the hybrid pipe and an inner peripheral surface of the intermediate portion of the hybrid pipe is coated with an adhesive coating material so that a hardness of the intermediate portion in the direction of the axis relatively varies.

In this aspect, the intermediate portion of the hybrid pipe has a hard portion coated with the coating material and a soft portion not coated with a coating material, so that an energy absorbing characteristic needed for a compressing load in a direction intersecting the axis of the hybrid pipe can be achieved. Furthermore, since the hybrid pipe easily bends at a soft portion upon receiving even a small load in a direction of the axis, it is possible to provide an impact energy absorbing structure that has different strengths in a compressing direction intersecting the axis and a direction of the axis, by using a hybrid pipe that is uniform in material and sectional shape. This means that the impact energy absorbing structure is provided with directivity. Therefore, the above-described construction is useful for absorption of an impact load only in limited directions.

If the hardness in the directions of the axis relatively varies, at least one slit may be formed at a boundary between portions differing from each other in hardness.

Therefore, the hybrid pipe becomes more apt to bend at even a small load in a direction of the axis, so that the load in the directions of the axis further reduces.

In accordance with a sixth aspect of the invention, an impact energy absorbing component includes a hybrid pipe having a metal foil core member, and surface members laminated on opposite surfaces of the core member, each surface member being formed from a non-metal material. The core member and the surface members on the opposite surfaces of the core member are shaped so that the hybrid pipe has protruded portions and recessed portions that are contiguous in a direction of an axis of the hybrid pipe. The non-metal material of each surface member is a material that allows a kinetic friction coefficient of the surface member to be brought close to a static friction coefficient of the surface member.

In the sixth aspect of the invention, at least one of the surface members may have a fastener pile surface on a side thereof remote from the core member.

In the sixth aspect of the invention, at least one of the surface members may be formed by a silicone rubber sheet supported on a polyester support.

In the sixth aspect of the invention, at least one of the surface members may be formed by a polyurethane film sheet.

In the sixth aspect of the invention, at least one of the surface members .may be formed by an acryl film sheet.

An impact energy absorbing structure in an upper vehicle body portion according to the invention can be formed by disposing an energy absorbing member as described above in an interval between a vehicle body structure member and an interior trim.

If a load is applied in a direction intersecting the axis of the energy absorbing member, the energy absorbing member is compressed so that the sectional shape thereof slightly changes. Therefore, bent portions of each surface member located adjacent to each other and facing each other are brought into the close contact, so that a sliding resistance is produced. The sliding resistance, that is, a friction force, restrains the energy absorbing member from undergoing compression deformation, and restrains the energy absorbing member from elongating the directions of the axis so as to substantially retain the current sectional shape. As the compressing force gradually increases so that the shape retaining limit based on the sliding resistance is reached, the energy absorbing member starts elongating in the directions of the axis, so that the apparent plate thickness of the energy absorbing member reduces and the reaction load reduces.

Since each surface member is formed from a material that allows a kinetic friction coefficient of the surface member to be brought close to a static friction coefficient of the surface member, that is, since each surface member is formed from a material having a kinetic friction coefficient approximately equal to the static friction coefficient thereof, a great sliding resistance is produced between the bent portions of each surface member that face each other. With increases in the sliding resistance, the duration during which the compression deformation of the energy absorbing member is restrained and therefore the axial elongation thereof is restrained becomes longer. Furthermore, while the shape retainment by the sliding resistance is effective, the load remains substantially constant. Consequently, the area defined by the load-displacement energy absorbing characteristic curve, that is, the amount of energy absorbed, increases.

Since the hybrid pipe is hollow and light-weight, the hybrid pipe can easily be processed into an arbitrary sectional shape. Therefore, the load-displacement energy absorbing characteristics can easily be adjusted by changing the pitch between adjacent protruded portions (recessed portions) or the apparent plate thickness of the pipe.

If each surface member of the hybrid pipe has a fastener pile surface on a side remote from the core member, bent portions of the fastener pile surface closely contact and interfere with each other, so that the shape retaining function based on the sliding resistance is further enhanced. Therefore, the amount of energy absorbed increases. Furthermore, compared with a hybrid pipe whose surface members are made of kraft paper, the hybrid pipe with the fastener pile surfaces achieves energy absorbing characteristics with a sharper rising of load. Since a certain length of time is required before the fastener pile surface starts sliding and the load starts reducing, the above-described hybrid pipe provides an energy absorbing member with a high energy absorbing efficiency. Furthermore, the energy absorbing characteristics can easily be adjusted by changing the density per unit area of the fastener pile, or changing the length of the fastener pile surface. Further, since the fastener pile, covering surfaces of the hybrid pipe, is formed as a plastic sheet, the weather resistance of the hybrid pipe improves, so that an energy absorbing member with reduced deterioration over time can be obtained.

If each surface member of the hybrid pipe is formed by a silicone rubber sheet supported on a polyester support, the shape retaining function based on the sliding resistance increases, so that the amount of energy absorbed increases. Furthermore, since a certain length of time is required before the silicone rubber sheet starts sliding and the load start reducing, the hybrid pipe incorporating silicone rubber sheets provides an energy absorbing member with a high energy absorbing efficiency. The polyester support substantially prevents elongation or contraction of the silicone rubber sheet, and has an excellent property of adhering to the silicone rubber sheet. Therefore, there is substantially no danger that the silicone rubber sheet may peel during production of an energy absorbing member or when the energy absorbing member receives an impact load.

If each surface member of the hybrid pipe is formed by a polyurethane film sheet, the amount of energy absorbed increases as the shape retaining function based on the sliding resistance is enhanced. Furthermore, since a certain length of time is required before the polyurethane film sheet starts sliding and the load start reducing, the hybrid pipe incorporating the polyurethane film sheets provides an energy absorbing member with a high energy absorbing efficiency. Further, since polyurethane is excellent in weather resistance, an energy absorbing member with reduced deterioration over time can be provided.

If each surface member of the hybrid pipe is formed by an acryl film sheet, the amount of energy absorbed increases as the shape retaining function based on the sliding resistance is enhanced. Furthermore, since a certain length of time is required before the acryl film sheet starts sliding and the load starts reducing, the hybrid pipe incorporating the acryl film sheets provides an energy absorbing member with a high energy absorbing efficiency. Since an acryl film sheet highly readily stretches, and has a good follow characteristic, and quickly reduces stress after being stretched, the employment of an acryl film facilitates production of a hybrid pipe, and eliminates the variation in energy absorption by the energy absorbing member that would otherwise be caused by residual stress.

An impact energy absorbing structure in an upper vehicle body portion wherein the energy absorbing member is disposed between a structure member and an interior trim as described above is able to effectively absorb impact energy in an upper vehicle body portion having a structure member, such as a pillar or a roof side rail, where it is not possible to provide a large energy absorbing interval or space due to requirements for a wide and clear view for a driver or passenger, elimination of impediments to entrance into and exit from the passenger compartment, and a maximized compartment space.

In accordance with a seventh aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe. The hybrid pipe is twisted about its axis.

A hybrid pipe is cut into a predetermined length, and the cut hybrid pipe is twisted about its axis by firmly setting the pipe at both ends thereof and applying a torque to one of the ends or applying torques in opposite directions to both ends.

By twisting the hybrid pipe about its axis, the internal resistance or viscous resistance against elongation in the directions of the axis of the hybrid pipe are changed, which means that the apparent displacement of the hybrid pipe, that is, an energy absorbing member, is controlled and that the energy absorbing characteristics are adjusted. Therefore, the twisted hybrid pipe achieves energy absorbing characteristics with a sharp initial rising of load that are indicated by a roughly quadrilateral characteristic curve. That is, the twisted hybrid pipe is able to absorb large amounts of energy for small amounts of effective displacement. Furthermore, since the hybrid pipe is substantially made up of a metal foil core member and sheets laminated on the opposite surface of the core member, the hybrid pipe can be twisted by a small torque, thereby improving productivity. Further, since the hybrid pipe can easily be bent, it is easy to dispose the hybrid pipe so as to substantially conform to the shape of the structure member or the interior trim.

In the seventh aspect of the invention, two end portions of the hybrid pipe twisted about its axis may be connected to the structural member so that the two end portions of the hybrid pipe are prevented from moving relative to the structural member.

Therefore, the hybrid pipe is restrained from elongating in the directions of the axis, so that when a portion of the hybrid pipe receives an impact load and becomes compressed, the hybrid pipe does not escape or elongate in the directions of the axis. Consequently, an energy absorbing characteristic curve with a sharp rising that has a roughly quadrilateral shape can be achieved. That is, it becomes possible to absorb large amounts of energy for small amounts of effective displacement.

In the seventh aspect of the invention, an energy absorbing characteristic may be changed by changing at least one of a twist angle of the hybrid or metal pipe and a twist pitch length of the hybrid or metal pipe.

Since the energy absorbing characteristics can be adjusted simply by changing the twist angle or the twist pitch of the hybrid pipe, it becomes possible to select a hybrid pipe that has preferable energy absorbing characteristics for sites where energy absorption is required for vehicle models.

In the seventh aspect of the invention, the hybrid pipe may be a generally polygonal sectional shape and the hybrid pipe may be adhered to the interior trim.

Adhesion of the hybrid pipe to an interior trim that is likely to receive an impact load results, in effect, in an increase in the apparent plate thickness of the hybrid pipe, so that a roughly quadrilateral energy absorbing characteristic curve with a sharp rising can be achieved. Furthermore, since the hybrid pipe has a polygonal sectional shape, the hybrid pipe can easily be adhered to the interior trim.

If the hybrid pipe is adhered to the interior trim, an energy absorbing characteristic may be changed by changing at least one of an adhered area of the hybrid pipe and an adhered site of the hybrid pipe.

Since the energy absorbing characteristics can be adjusted simply by changing the adhered area or the adhered sites, it becomes possible to select a hybrid pipe that has energy absorbing characteristics preferable for sites where energy absorption is required for vehicle models, and to mount it to the interior trim.

In the seventh aspect of the invention, the structural member may be formed by a pillar and a side roof rail, and the hybrid pipe twisted about its axis may be disposed at an intersecting portion between the pillar and the roof side rail.

The interval between a structure member and an interior trim is less and therefore the effective distance for energy absorption is less at the intersecting portion between the pillar, such as a front pillar, a center pillar or quarter pillar, and the roof side rail, than at the front pillar and the roof side rail. However, since the hybrid pipe twisted about its axis achieves energy absorbing characteristics with a sharp rising, the impact energy absorbing structure is able to effectively absorb impact energy even at an intersecting portion with a small effective distance.

In accordance with an eighth aspect of the invention, the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe. The hybrid pipe is fastened so that when receiving an impact load, the hybrid pipe is allowed to elongate in the direction of the axis.

The hybrid pipe, made up of the metal foil core member and the sheets laminated on the opposite sides of the core member, readily deforms. When a portion of the hybrid pipe receives an impact load and undergoes compression deformation, the entire hybrid pipe elongates in the directions of the axis. Therefore, since the hybrid pipe is fastened in such a manner that elongation of the hybrid pipe is allowed, the hybrid pipe elongates in the directions of the axis and the apparent plate thickness of the hybrid pipe reduces as the hybrid pipe undergoes compression deformation. Consequently, the energy absorbing characteristics can be adjusted so that the load gradually reduces as the displacement increases.

In the eighth aspect of the invention, the hybrid pipe may be fastened so that when elongation of the hybrid pipe in the direction of the axis reaches a predetermined amount, the elongation thereof in the direction of the axis is restrained.

Therefore, upon an impact load, the hybrid pipe elongates in the directions of the axis thereof to a predetermined amount. The load reduces during the elongation of the hybrid pipe, and then the elongation of the hybrid pipe is restrained. Therefore, the energy absorbing characteristic curve has two peaks, so that the average load can be reduced.

In the eighth aspect of the invention, the hybrid pipe may have a generally polygonal sectional shape and the hybrid pipe may be adhered to the interior trim.

Adhesion of the hybrid pipe to an interior trim that is likely to receive an impact load results, in effect, in an increase in the apparent plate thickness of the hybrid pipe, so that a roughly quadrilateral energy absorbing characteristic curve with a sharp rising can be achieved. Furthermore, since the hybrid pipe has a polygonal sectional shape, the hybrid pipe can easily be adhered to the interior trim.

In the eighth aspect of the invention, an energy absorbing characteristic may be changed by changing at least one of an adhered area of the hybrid pipe and an adhered site of the hybrid pipe.

Since the energy absorbing characteristics can be adjusted simply by changing the adhered area or the adhered site of the hybrid pipe, it become possible to select a hybrid pipe that has preferable energy absorbing characteristics for sites where energy absorpton is required for vehicle models, and to mount the selected hybrid pipe to the interior trim.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
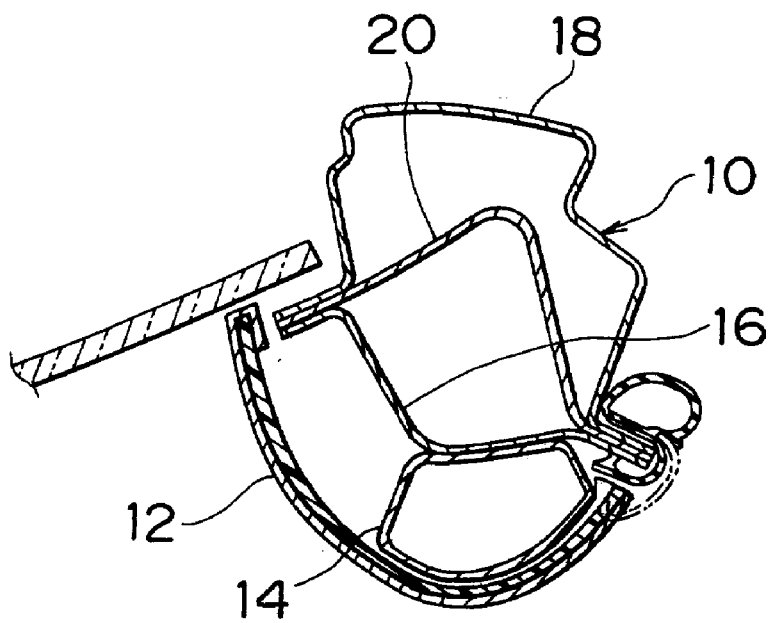
FIG. 1 is a vertical sectional view of an upper vehicle body portion (front pillar) to which an impact energy absorbing structure according to the invention is applicable.
Figure 2:
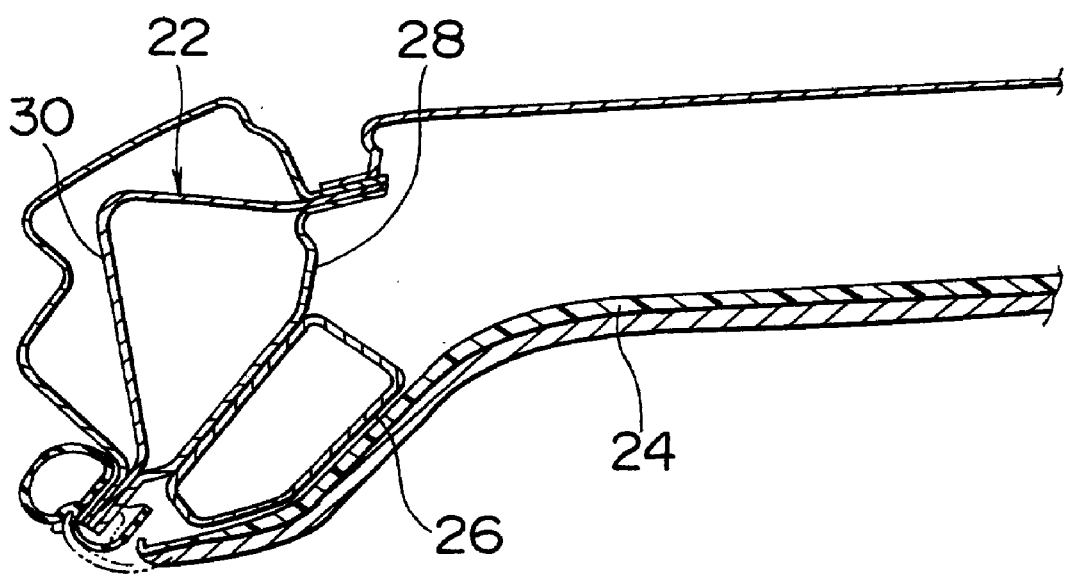
FIG. 2 is a horizontal sectional view of an upper vehicle body portion (roof side rail) to which an impact energy absorbing structure according to the invention is applicable.

An impact energy absorbing structure according to the invention is shown in FIGS. 1 and 2.

An impact energy absorbing structure shown in the sectional view in FIG. 1 absorbs impact energy in an upper vehicle body portion including a vehicle body structure member 10, an interior trim (pillar garnish) 12 spaced inward from the structure member 10, and an energy absorbing member 14 disposed in the interval between the structure member 10 and the interior trim 12. In the impact energy absorbing structure shown in FIG. 1, the structure member 10 is a front pillar having an inner panel 16, an outer panel 18 and a reinforcement panel 20. Flanges of the panels are placed on top of one another and joined together so as to form a closed sectional shape.

An impact energy absorbing structure shown in the sectional view in FIG. 2 absorbs impact energy in an upper vehicle body portion including a vehicle body structure member 22, an interior trim (roof lining) 24 spaced inward from the structure member 22, and an energy absorbing member 26 disposed in the interval between the structure member 22 and the interior trim 24. In the impact energy absorbing structure shown in FIG. 2, the structure member 22 is a roof side rail having an inner panel 28, and an outer panel 30. Flanges of the panels are placed on top of each other and joined together so as to form a closed structure.

Even if the structure member is a member other than the aforementioned member, for example, a center pillar, a quarter pillar, a front header, a rear header or the like, an impact energy absorbing structure according to the invention may also be realized by disposing an energy absorbing member in an interval between the structure member and an interior trim spaced inward from the structure member. In such a structure, the energy absorbing member may have a suitable shape that is determined in accordance with the site where the member is disposed, as in the case of the energy absorbing member 14 shown in FIG. 1 or the energy absorbing member 26 shown in FIG. 2. The invention will be described below in conjunction with a typical energy absorbing member that is not necessarily limited by the shape of the energy absorbing member 14 or the shape of the energy absorbing member 26.

A basic construction of a hybrid pipe used as an energy absorbing member according to the invention will be described with reference to FIGS. 3 and 4.

Figure 3:
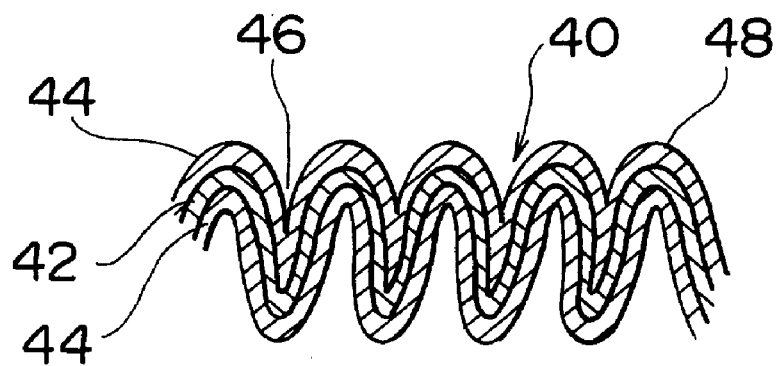
FIG. 3 is an enlarged sectional view of an embodiment of a hybrid pipe used in an impact energy absorbing structure in an upper vehicle body portion according to the invention, taken on a plane extending in directions of an axis thereof.
Figure 4:
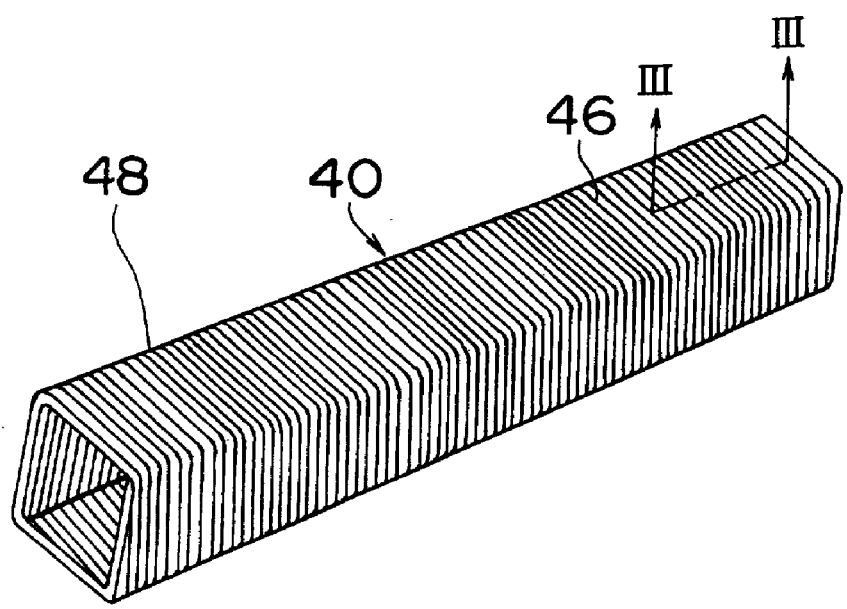
FIG. 4 is a perspective view of the embodiment of a hybrid pipe used in an impact energy absorbing structure in an upper vehicle body portion according to the invention.

As shown in the sectional view in FIG. 3 and the perspective view in FIG. 4, a hybrid pipe 40 is substantially made up of a metal foil-made core member 42 and sheets 44 of a material other than metal that are laminated on opposite surfaces of the core member 42. The metal foil core member 42 and the sheets 44 are fixed to each other, such as by an adhesive. The hybrid pipe 40 is formed by shaping the core member 42 and the sheets 44 so that the hybrid pipe 40 has protruded portions 48 and recessed portions 46 that are contiguous in the directions of an axis of the hybrid pipe 40.

The core member 42 is made of a hard aluminum foil, and the sheets 44 are made of kraft paper. The aluminum foil has a thickness of at least 0.05 mm and a width of at least 30 mm. The kraft paper sheets have a thickness of at least 0.2 mm and a width of at least 30 mm. The core member 42 may also be made of a stainless steel foil, a magnesium alloy foil or the like. The sheets 44 may also be made of a resin or the like. In the hybrid pipe shown in FIG. 4, the protruded and recessed portions extend helically. Instead of such a helical configuration, it is also possible to adopt a looped configuration in which a recessed portion 46 extends around the periphery of the pipe and forms a complete loop and, adjacent to the recessed portion 46, two independent protruded portions 48 extend around the periphery of the pipe and form complete loops.

Various embodiments of the invention will be described below. In the embodiments, the structure member is similar to that shown in FIG. 1 or 2, and the hybrid pipe used as an energy absorbing member has substantially the same basic construction as that shown in FIGS. 3 and 4.

A first embodiment of the invention will be described with reference to FIGS. 5 through 9.

Figure 5:
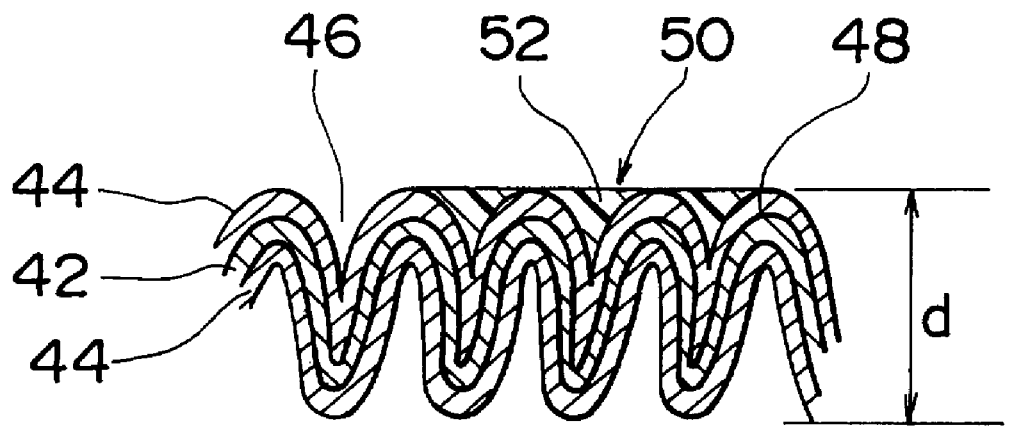
FIG. 5 is an enlarged sectional view of another embodiment of a hybrid pipe used in an impact energy absorbing structure in an upper vehicle body portion according to the invention, taken on a plane extending in directions of an axis thereof.

As shown in FIG. 5, portions of an outer peripheral surface of a hybrid pipe 50 are coated with an adhesive coating material 52. The outer peripheral surface of the hybrid pipe 50 may also be coated with the coating material 52 over the entire length of the pipe. It is also possible to partially coat the hybrid pipe 50, for example, a central portion or an end portion thereof, with the coating material 52. Furthermore, the coating material 52 may extend over the entire length of the periphery of the hybrid pipe 50 or only a portion of the length of the periphery thereof. Therefore, if the hybrid pipe 50 has a quadrilateral outline cross section as shown in FIG. 4, it is possible to coat only one side of the four sides, that is, only a portion of the length of the periphery of the hybrid pipe 50, with the coating material 52.

The coating material 52 may be acrylic resin, epoxy resin, or other kinds of resins. The coating material 52 may be applied by a method such as brush application, nozzle spraying, or the like. In a portion of the hybrid pipe 50 coated with the coating material 52, the protruded portions 48 are adhered to each other by the coating material 52, so that the coated portion becomes hard and restrained from being displaced in the directions of the axis of the hybrid pipe 50. Furthermore, in the coated portion of the hybrid pipe 50, the compression resistance in directions intersecting the axis of the hybrid pipe 50 increases. In contrast, in a portion not coated, that is, a plain hybrid pipe portion, the original characteristics of the hybrid pipe 50 are maintained, so that the uncoated portion of the hybrid pipe 50 is soft. Therefore, if the uncoated portion of the hybrid pipe 50 receives a compressing load in a direction intersecting the axis of the hybrid pipe 50, adjacently located protruded portions 48 in the uncoated portion are displaced in directions of the axis. Thus, a portion of the hybrid pipe 50 coated with the coating material 52 and an uncoated portion thereof differ from each other in the apparent thickness d and the resistance against compression in directions intersecting the axis of the hybrid pipe 50. The energy absorbing characteristics of the hybrid pipe 50 can thus be adjusted.

For example, if the hybrid pipe 50 is fastened at its opposite ends thereof to a structure member in an upper vehicle body portion by using tapping screws or the like, an impact load is likely to act on the hybrid pipe 50 from diagonally downward to diagonally upward. Such an impact load bends the hybrid pipe 50 into an upwardly convex shape, so that the rising of load becomes correspondingly gentler. However, if the hybrid pipe 50 is coated with the adhesive coating material 52 as in this embodiment, the bending of the hybrid pipe 50 is reduced, so that a sharp rising of load can be achieved.

Figure 6:
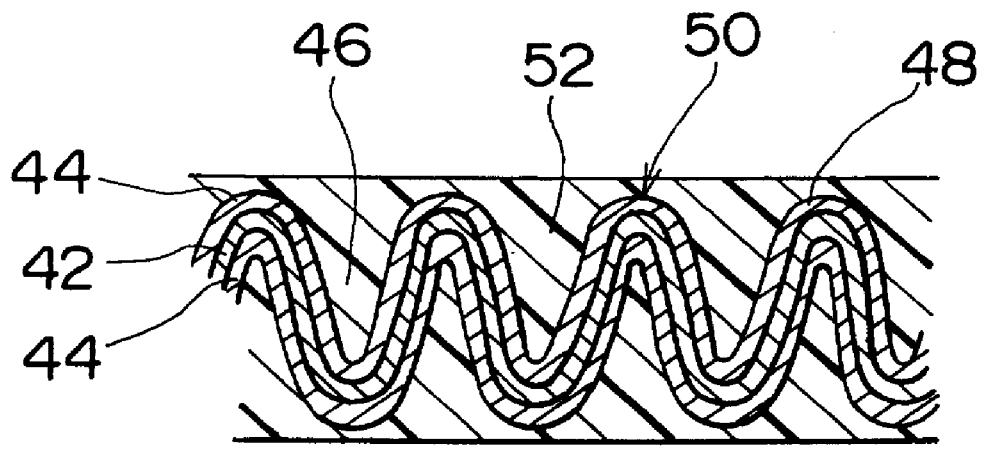
FIG. 6 is an enlarged sectional view of still another embodiment of a hybrid pipe used in an impact energy absorbing structure in an upper vehicle body portion according to the invention, taken on a plane extending in directions of an axis thereof.

To adjust the energy absorbing characteristics by changing the coating site and coating thickness of the coating material 52, the coating material 52 may be provided only on the outer peripheral surface of the hybrid pipe 50 as shown in FIG. 5, or only on the inner peripheral surface, or on both the outer peripheral surface and the inner peripheral surface of the hybrid pipe 50 as shown in FIG. 6 over the entire length or a portion of the length of the hybrid pipe 50. By providing the coating material 52 on the outer and inner peripheral surfaces of the hybrid pipe 50, the apparent plate thickness of the hybrid pipe 50 further increases and the resistance against elongation in the directions of the axis involved in compression further increases. As a result, energy absorbing characteristics with a sharp rising of load can be achieved. The coating material 52 can easily be provided on the outer and inner peripheral surfaces over the entire length of the hybrid pipe 50 simply by dipping the hybrid pipe 50 in a bath containing the coating material 52, thereby offering an advantage in surface treatment. This arrangement may also be applied to other embodiments described below.

Figure 7:
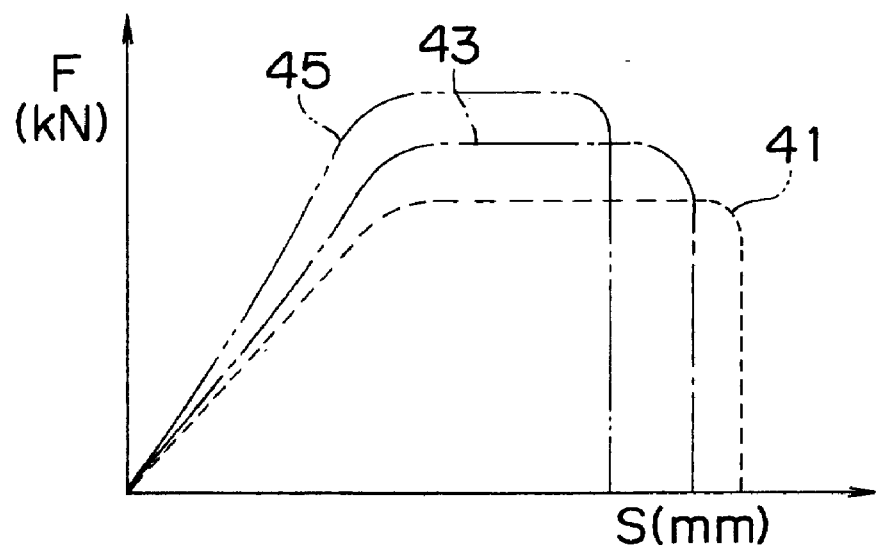
FIG. 7 is a graph indicating load-displacement energy absorbing characteristics.

FIG. 7 is a graph indicating load(F)-displacement(S) energy absorbing characteristics of different hybrid pipes. Compared with the energy absorbing characteristic curve 41 (broken line) of a hybrid pipe not having a coating material, the energy absorbing characteristic curves 43 (single-dot line) and 45 (double-dot line) of hybrid pipes each having a coating material 52 exhibit sharp rising of load F and small amounts of displacement S. The coating material 52 of the hybrid pipe indicated by the double-dot line 45 is thicker than that of the hybrid pipe indicated by the single-dot line 43. As indicated, the thicker coating material 52 (double-dot line 45) achieves a sharper rising of load F and a smaller displacement S than the thinner coating material 52 (single-dot line 43).

Figure 8:
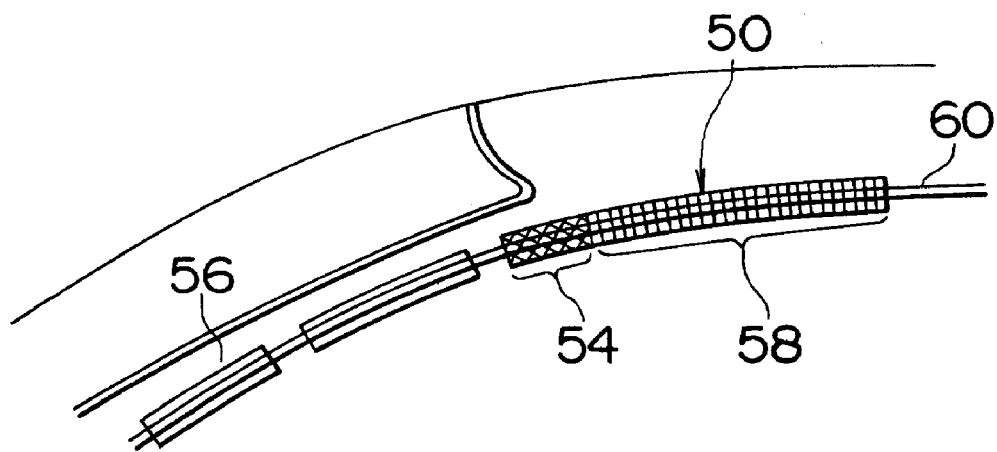
FIG. 8 is a side view illustrating a hybrid pipe mounted in an upper vehicle body portion.
Figure 9:
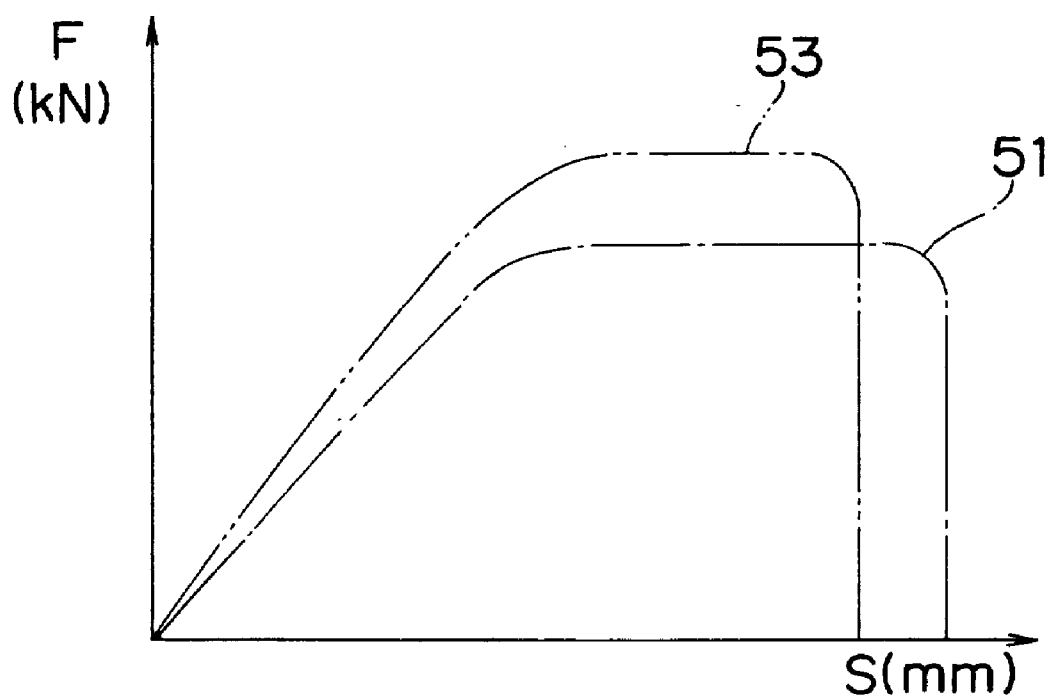
FIG. 9 is a graph indicating load-displacement energy absorbing characteristics.

In a structure shown in FIG. 8, a hybrid pipe 50 has a coating material 52 on a forward end portion 54 indicated by cross-hatching, and does not have a coating material 52 on the other portion 58 of the hybrid pipe 50. The hybrid pipe 50 is mounted in the vehicle body so that the forward end portion 54 thereof is located at an intersecting portion between a front pillar 56 and a roof side rail 60. As indicated by the load(F)-displacement(S) energy absorbing characteristic curves shown in FIG. 9, the energy absorbing characteristic curve 53 of the end portion 54 of the hybrid pipe 50 located adjacent to the intersecting portion exhibits a sharper rising of load F and a smaller displacement S than the energy absorbing characteristic curve 51 of the other portion 58 of the hybrid pipe 50. At the intersecting portion between the front pillar 56 and the roof side rail 60, the interval between the structure member and the interior trim is small so that it is difficult to provide a sufficient large displacement space for the energy absorbing member disposed therein. However, by disposing the hybrid pipe 50 in such a manner that the end portion 54 coated with the coating material 52 is located at the intersecting portion, sufficient energy absorption can be achieved even in the reduced interval at the intersecting portion.

The hybrid pipe 50 is coated with an adhesive coating material in accordance with desired or required energy absorbing characteristics as described above. The "desired or required energy absorbing characteristics" means energy absorbing characteristics improved over those of hybrid pipes not coated with a coating material, as indicated by the energy absorbing characteristic curves 43, 45, 53 shown in FIGS. 7 and 9. The "desired or required energy absorbing characteristics" also means original or designed energy absorbing characteristics that are recovered from a difficult situation where the original energy absorbing characteristics are not readily realized.

Figure 10:
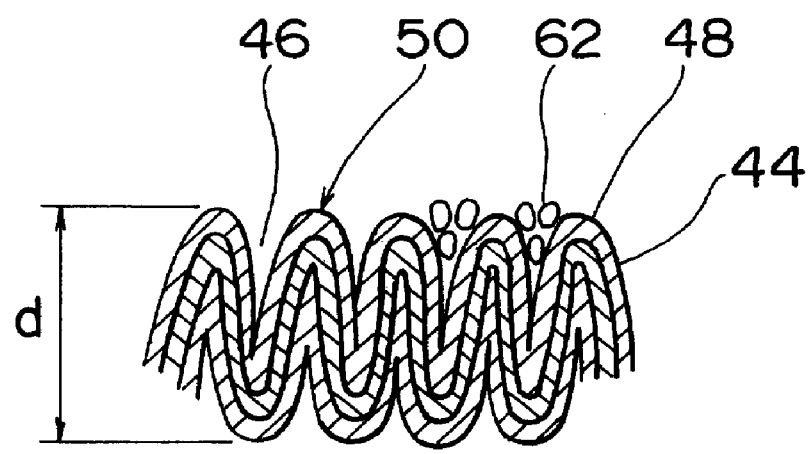
FIG. 10 is an enlarged fragmentary sectional view of a hybrid pipe used in an impact energy absorbing structure in an upper vehicle body portion, taken on a plane extending in directions of an axis thereof.

The hybrid pipe 50 may receive moisture due to condensation if there is a great temperature difference between the inside and the outside of the passenger compartment in cold weather. If the sheet 44 on the obverse side of the hybrid pipe 50, that is, the outer peripheral surface thereof, is made of paper, the sheet 44 swells upon deposition of water droplets 62 in recessed portions 46 as shown in FIG. 10. After that, the water will evaporate and the sheet 44 will dry. It has been found that repeated cycles of swelling and drying of the sheet 44 of a hybrid pipe reduces the proof stress of the hybrid pipe by about 5–10%. Such a proof stress reduction can be prevented by coating the outer peripheral surface of hybrid pipe 50 with the coating material 52. If the water 62 in the recessed portions 48 freezes, the volume expansion involved in water freezing creates a force in directions of the axis of the hybrid pipe 50, which acts on the hybrid pipe 50. As a result, the protruded portions 48 of the hybrid pipe 50 are forced to spread out in the directions of the axis, thereby reducing the apparent plate thickness d of the hybrid pipe 50 and resulting in energy absorbing characteristics with a gentler rising of load. This problem can be prevented by coating the outer peripheral surface of the hybrid pipe 50 with the coating material 52.

Figure 11:
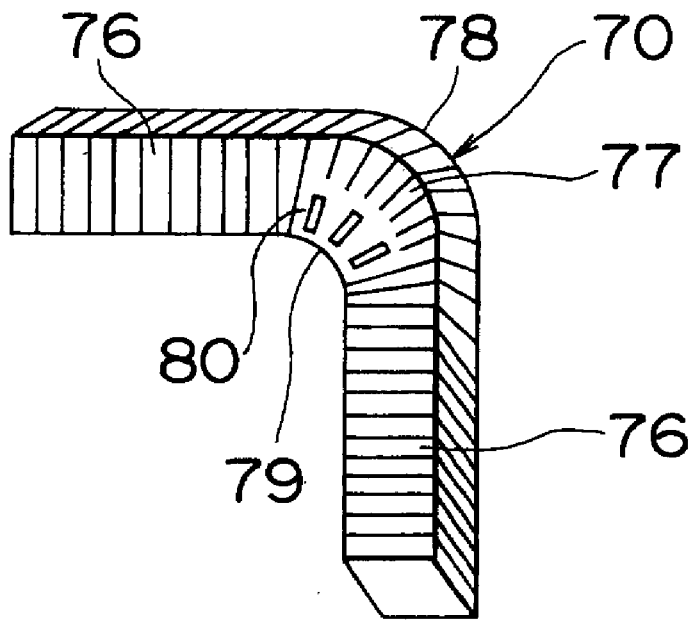
FIG. 11 is a side view of a further embodiment of a hybrid pipe used in impact energy absorbing structure in an upper vehicle body portion according to the invention.
Figure 12:
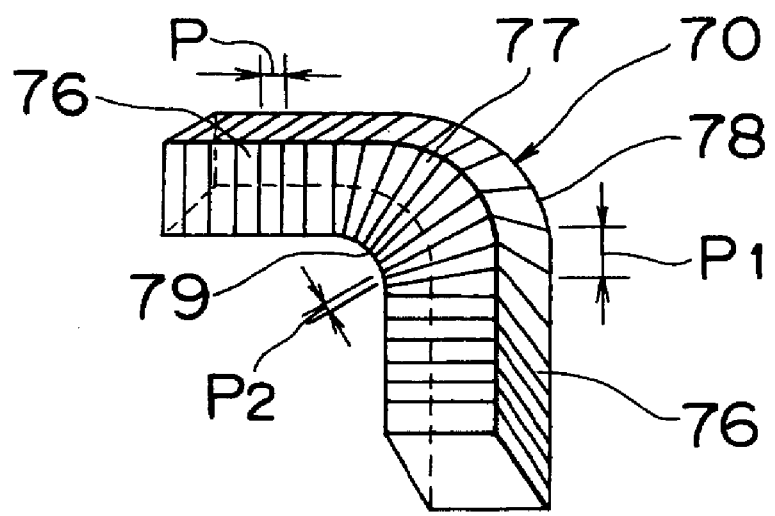
FIG. 12 is a side view of the hybrid pipe shown in FIG. 11, illustrating changes in protrusion pitch.
Figure 13:
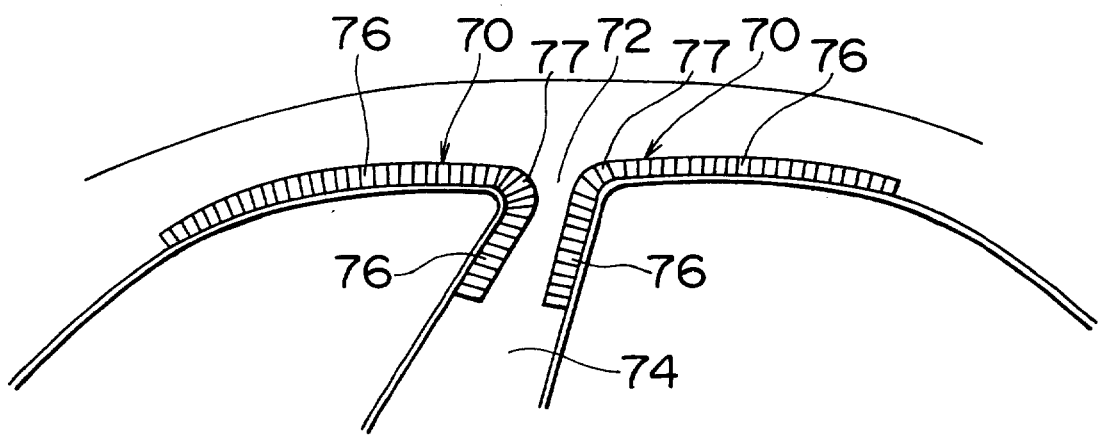
FIG. 13 is a side view illustrating a hybrid pipe mounted in an upper vehicle body portion.
Figure 14:
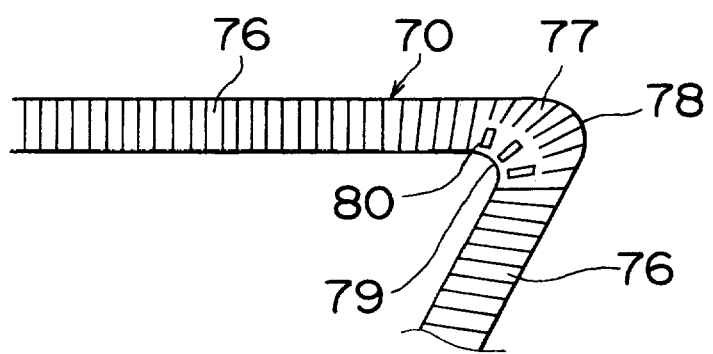
FIG. 14 is an enlarged side view of the hybrid pipe shown in FIG. 13.

A second embodiment will be described with reference to the perspective views in FIGS. 11 and 12, the side views in FIGS. 13 and 14, and the energy absorbing characteristic curves shown in FIGS. 15 and 16. A hybrid pipe 70 is formed from substantially the same materials into substantially the same structure as the hybrid pipe 50. The hybrid pipe 70 is bent so as to conform to the shapes of structure members 72, 74. The structure member 72 is a roof side rail, and the structure member 74 is a center pillar.

The hybrid pipe 70, bent as mentioned above, has two straight portions 76 and a bent portion 77 interconnecting the straight portions 76. The bent portion 77 has an outer peripheral surface 78 of a smaller curvature, and an inner peripheral surface 79 of a larger curvature. The pitch in the straight portions 76, that is, the distance between two adjacent protruded portions or recessed portions, remains the same. However, the pitch P1 in the decreased-curvature outer peripheral surface 78 is greater than the pitch P in the straight portions 76. The pitch P2 in the increased-curvature inner peripheral surface 79 is smaller than the pitch P in the straight portions 76. Therefore, the apparent plate thickness in the decreased-curvature outer peripheral surface 78 becomes less than that in the straight portions 76, so that the outer peripheral surface portion 78 tends to deform more easily, that is, it is soft. The apparent plate thickness in the increased-curvature inner peripheral surface 79 becomes greater than that in the straight portions 76, so that the inner peripheral surface 79 is less easy to deform, that is, it is hard. To reduce this problem, the hybrid pipe 70 is strengthened at the site of the decreased-curvature outer peripheral surface 78 by coating the outer peripheral surface 78 with a coating material, and the hybrid pipe 70 is weakened at the site of the increased-curvature inner peripheral surface 79 by forming slits 80 in the inner peripheral surface 79.

Figure 15:
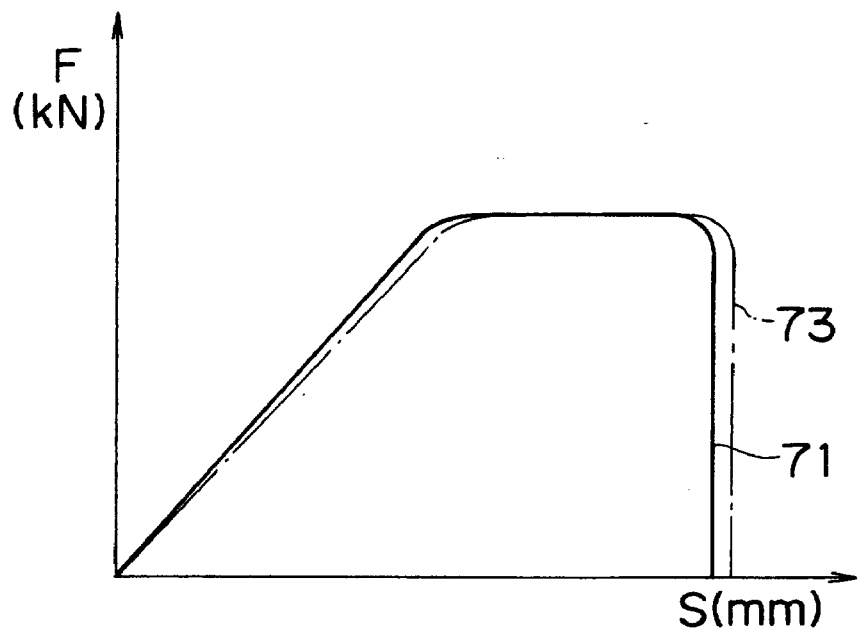
FIG. 15 is a graph indicating load-displacement energy absorbing characteristics.
Figure 16:
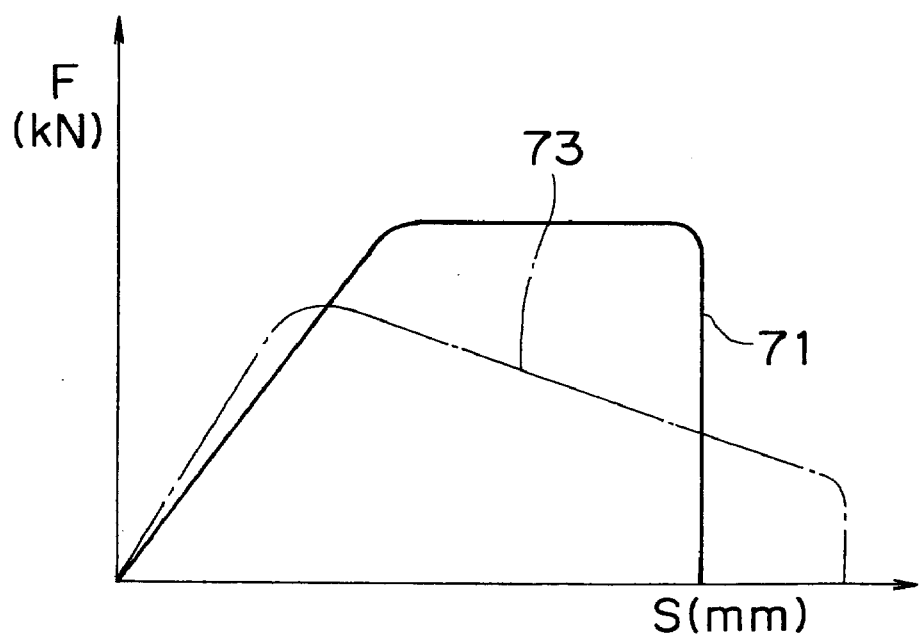
FIG. 16 is a graph indicating load-displacement energy absorbing characteristics.

As indicated by the load(F)-displacement(S) energy absorbing characteristic curves shown in FIG. 15, an energy absorbing characteristics 73 of the straight portions 76 and an energy absorbing characteristics 71 of the bent portion 77 having a strengthened outer peripheral side portion and a weakened inner peripheral side portion have substantially the same energy absorbing characteristics. In contrast, if neither one of the peripheral side portions of the bent portion 77 is weakened or strengthened, the energy absorbing characteristics 73 of the bent portion 77 become less stable than the energy absorbing characteristics 71 of the straight portions 76 as indicated by the energy absorbing characteristic curves shown in FIG. 16.

A third embodiment will be described with reference to FIGS. 17 through 27.

Figure 17:
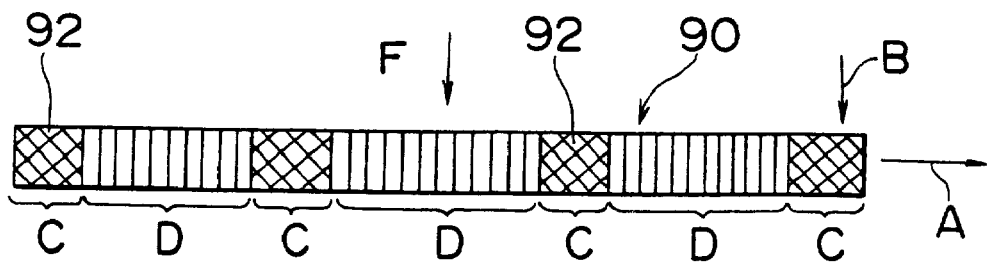
FIG. 17 is a side view of a further embodiment of a hybrid pipe used in an impact energy absorbing structure in an upper vehicle body portion according to the invention.
Figure 18:
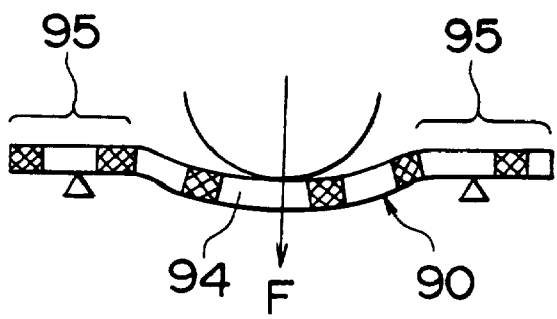
FIG. 18 is a schematic illustration of the operation of the hybrid pipe shown in FIG. 17.

Referring to the side view in FIG. 17, a hybrid pipe 90 carries an adhesive coating material 92 on its outer peripheral surface. More specifically, a plurality of portions of the hybrid pipe 90 spaced by predetermined intervals in the directions of the axis of the hybrid pipe 90 have an adhesive coating material 92 on their outer peripheral surfaces. That is, the hybrid pipe 90 has hard portions C and soft portions D that alternate in a direction of the axis indicated by arrow A in FIG. 17. The length of each hard portion C in the direction of the axis may be set to about 1 cm to about 5 cm. The length of each soft portion D in the direction of the axis may be set to about 5 cm to about 15 cm. The alternating hard portions C and soft portions D may also be formed by coating the entire length of the hybrid pipe 90 with a thin adhesive coating material layer, and coating portions of the hybrid pipe 90 spaced by predetermined intervals in the direction of the axis with a thick adhesive coating material layer.

Figure 19:
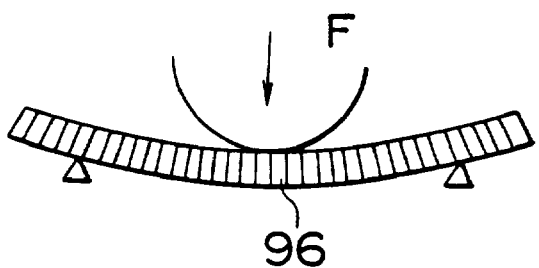
FIG. 19 is a schematic illustration of the operation of an ordinary hybrid pipe.

If a compressing load F acts on the hybrid pipe 90 in a direction B intersecting the axial direction A, elongation in directions of the axis caused by compression of a soft portion D is restrained by hard portions C. Therefore, it is difficult to propagate compression deformation occurring at one site in the hybrid pipe 90 to a site remote from that site of deformation. That is, as indicated by the schematic illustration in FIG. 18, if a compressing load F occurs, the hybrid pipe 90 deforms at a portion 94 thereof where the compressing load F acts, but portions 95 of the hybrid pipe 90 remote from the site of the compressing force remains as they were before the occurrence of the compressing force. Therefore, a portion 95 remote from the site of the compressing force can deform and absorb energy if receiving a compressing force F later. In contrast, in the case of an ordinary hybrid pipe 96 not having hard portions and soft portions that alternate in the axial direction as shown in FIG. 19, the entire hybrid pipe 96 deforms (over a wide range) once the hybrid pipe 96 receives a compressing force. Therefore, if a portion of the hybrid pipe 96 remote from the site of the compressing force receives a compressing force later, it will be difficult to absorb a sufficient amount of energy.

Figure 20:
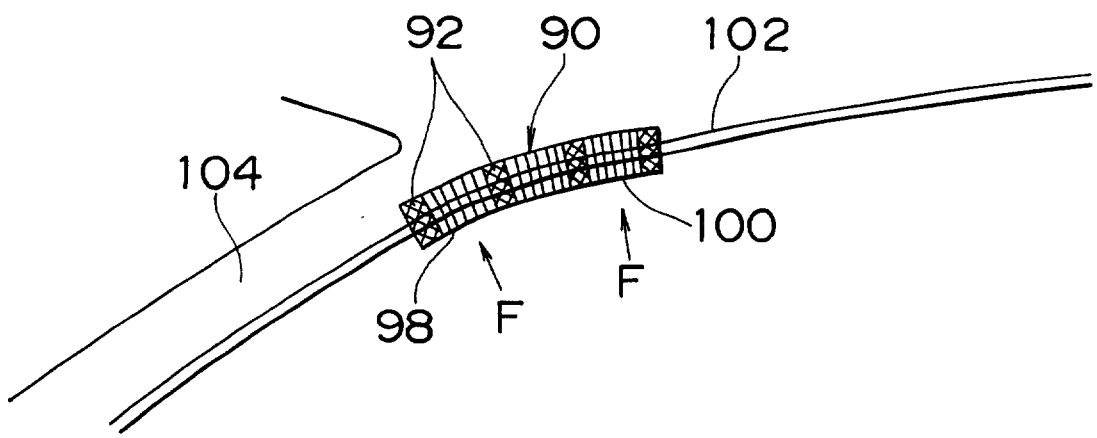
FIG. 20 is a side view illustrating a hybrid pipe mounted in an upper vehicle body portion.
Figure 21:
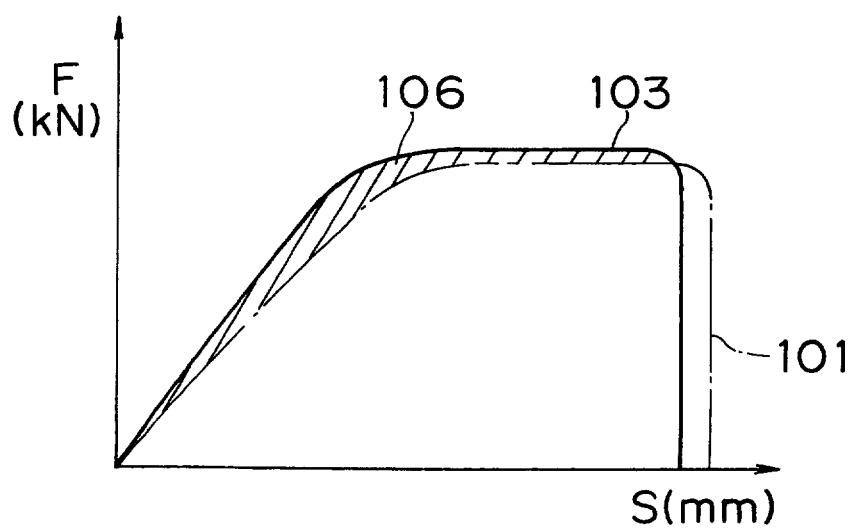
FIG. 21 is a graph indicating load-displacement energy absorbing characteristics.
Figure 22:
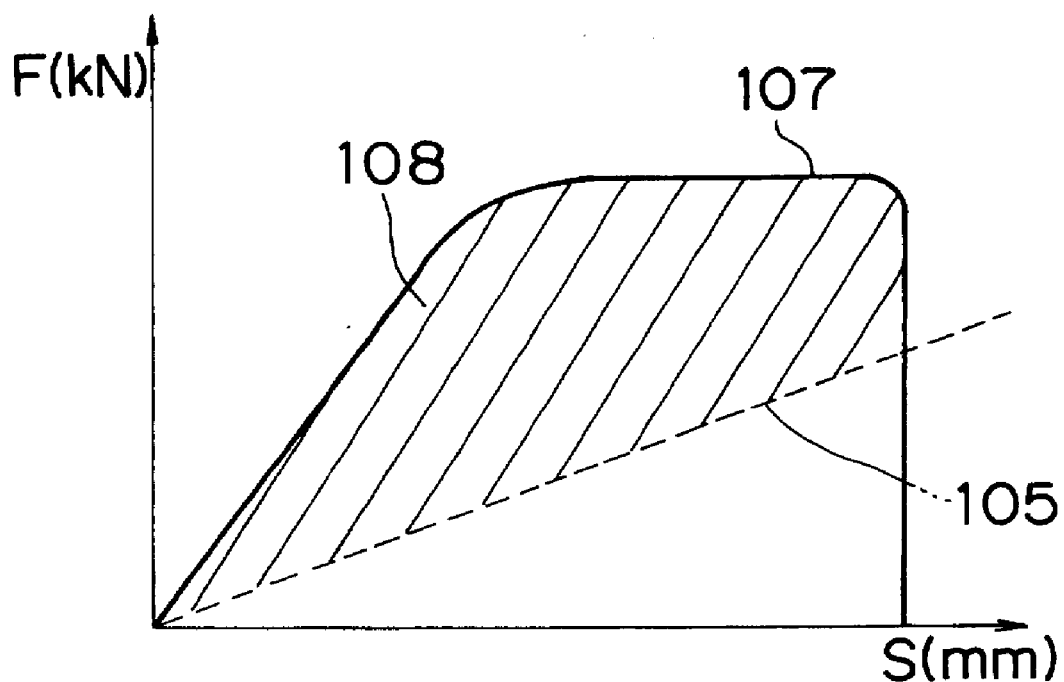
FIG. 22 is a graph indicating load-displacement energy absorbing characteristics.

In a structure shown in the side view in FIG. 20, the hybrid pipe 90 is mounted at an intersecting portion between a front pillar 104 and a roof side rail 102. If a load F acts on a forward portion 98 of the hybrid pipe 90, a load(F)-displacement (S) energy absorbing characteristic indicated by a curve 103 (solid line) in the graph in FIG. 21 is exhibited. If a load F later acts on a rearward portion 100 of the hybrid pipe 90, a load(F)-displacement(S) energy absorbing characteristic indicated by a curve 101 (single-dot line) in the graph in FIG. 21 is exhibited. A hatched narrow area 106 in the graph of FIG. 21 indicates an amount energy that could be additionally absorbed if the rearward portion 100 remained undeformed, that is, a loss in energy absorption caused by the deformation of the rearward portion resulting from the load applied to the forward portion 98 of the hybrid pipe 90. That is, the loss is relatively small in the case of hybrid pipe 90. In the case of the ordinary hybrid pipe 96, in contrast, the loss is considerably increased as indicated in the graph in FIG. 22, more specifically, as indicated by a hatched area 108 between an energy absorbing characteristic curve 107 (solid line) exhibited when a load acts on a forward portion of the ordinary hybrid pipe 96 and an energy absorbing characteristic curve 105 (broken line) exhibited when a load later acts on a rearward portion of the hybrid pipe 96.

Although in the foregoing description, the hybrid pipe has a prism shape with a generally quadrilateral section, the cross sectional shape of the hybrid pipe may also be other polygonal shapes, such as a pentagonal shape, a hexagonal shape, or the like. The cross sectional shape of the hybrid pipe may also be circular or elliptic.

Figure 23:
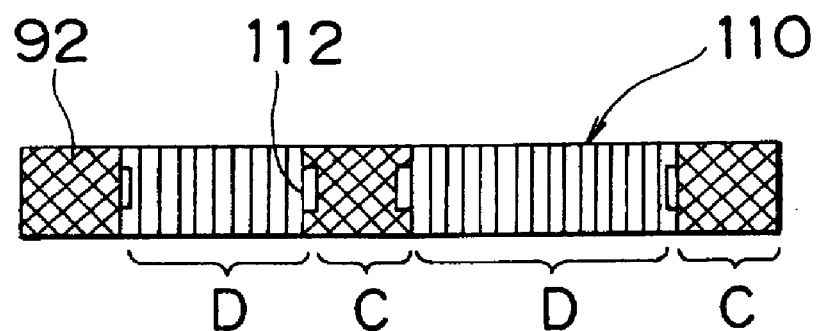
FIG. 23 is a side view of a further embodiment of a hybrid pipe used in an impact energy absorbing structure in an upper vehicle body portion according to the invention.

A hybrid pipe 110 shown in the side view in FIG. 23 has hard portions C and soft portions D that alternate in the directions of an axis of the hybrid pipe 110, similar to the hybrid pipe 90. The hybrid pipe 110 further has slits 112 that are formed at boundaries between the hard portions C and the soft portions D. The hard portions C reduce the elongation in the directions of the axis involved in compression deformation of the hybrid pipe 110 as described with reference to FIG. 18. This effect is enhanced by forming the slits 112.

Figure 24:
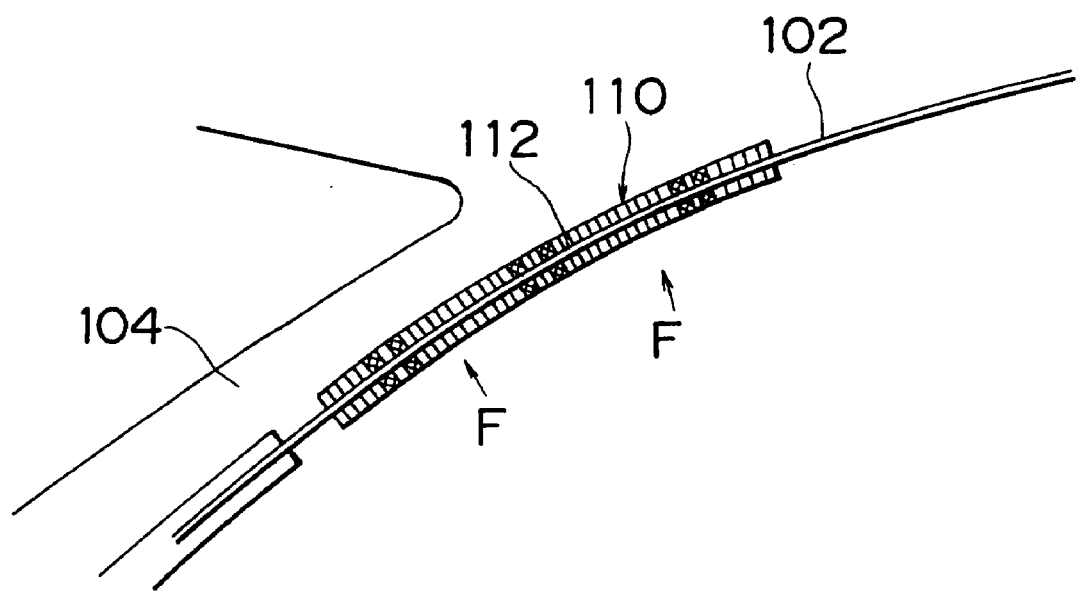
FIG. 24 is a side view illustrating a hybrid pipe mounted in an upper vehicle body portion.

As shown in the side view in FIG. 24, the hybrid pipe 110 is mounted at an intersecting portion between a front pillar 104 and a roof side rail 102. If a compressing load F occurs on a forward portion of the hybrid pipe 110 and a compressing load F subsequently occurs on a rearward portion thereof, the hybrid pipe 110 exhibits load-displacement energy absorbing characteristics similar to those indicated in FIG. 21. However, since the slits 112 are formed in the hybrid pipe 110, the elongation in the directions of the axis is further held down. As a result, the energy absorption loss becomes smaller than the loss 106 indicated in FIG. 21.

Figure 25:
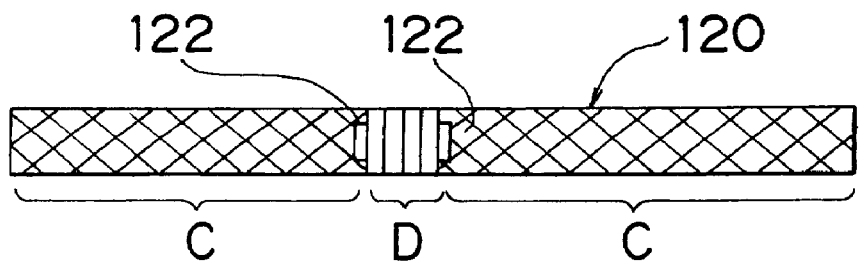
FIG. 25 is a side view of a further embodiment of a hybrid pipe used in an impact energy absorbing structure in an upper vehicle body portion according to the invention.
Figure 26:
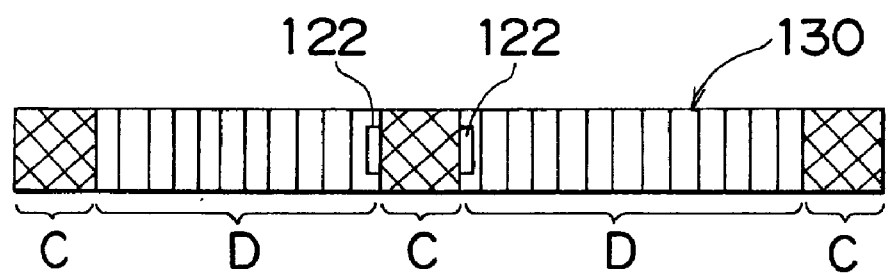
FIG. 26 is a side view of a further embodiment of hybrid pipe used in an impact energy absorbing structure in an upper vehicle body portion according to the invention.
Figure 27:
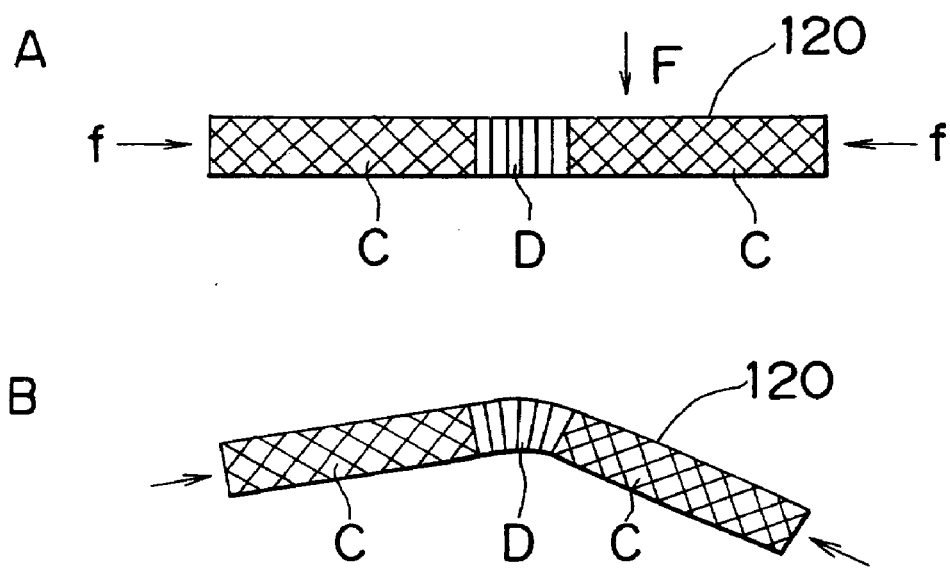
FIGS. 27A and 27B are schematic illustrations of the operation of the hybrid pipe shown in FIG. 25.

Referring to the side views in FIGS. 25 and 26, hybrid pipes 120, 130 each have an intermediate portion that differs in hardness from other portions thereof. The hardness difference in the directions of the axis of each pipe is provided by changing the manner of coating the outer peripheral surfaces of the individual portions with an adhesive coating material. In the hybrid pipe 120 shown in FIG. 25, the intermediate portion in the directions of the axis is a soft portion D, and the other portions are hard portions C. In contrast, in the hybrid pipe 130 shown in FIG. 26, the intermediate portion and both end portions in the directions of the axis are hard portions C, and the two portions sandwiched by the three hard portions C are soft portions D. Slits 122 may be formed at boundaries between the hard portions C and the hard portions C in the hybrid pipes 120, 130.

Referring to the schematic illustrations in FIGS. 27A and 27B, the hybrid pipe 120 undergoes compression deformation and absorbs a required amount of energy upon receiving a load F in a direction intersecting the axis. However, with a load F acting in the axial directions as indicated in FIG. 27A, the hybrid pipe 120 readily bends at the soft portion D located at an intermediate position as indicated in FIG. 27B even if the load f is small. Thus, the hybrid pipe 120 forms an impact energy absorbing structure that exhibits a difference between the strength in a compressing direction intersecting the axis and the strength in the directions of the axis (that is, directivity). The hybrid pipe 130 undergoes compression deformation and absorbs a required amount of energy upon receiving a load in a direction intersecting the axis. With a load acting in a direction of the axis, the hybrid pipe 130 readily bends at a soft portion side of the boundary between a hard portion C and a soft portion D. The load-displacement energy absorbing characteristic of the hybrid pipe 130 is substantially the same as that of the hybrid pipe 120.

A fourth embodiment of the invention will be described with reference to FIGS. 28 through 36. A hybrid pipe used as an energy absorbing member in this embodiment has substantially the same basic construction as shown in FIGS. 3 and 4. In the fourth embodiment, a surface member 144 of a hybrid pipe 140 is formed from such a material that the kinetic friction coefficient of the surface member 144 can be brought close to the static friction coefficient thereof, that is, the maximum static friction coefficient at the start of sliding.

In this embodiment, the surface member 144 may be formed from one of materials mentioned below. In general, the surface member 144 is formed from such a material that the kinetic friction coefficient of the surface member 144 can be brought as close to the static friction coefficient thereof as possible by forming micro-irregularity, that is, small protrusions and recesses, on the surface, or forming a special coating on the surface, or the like.

Figure 28:
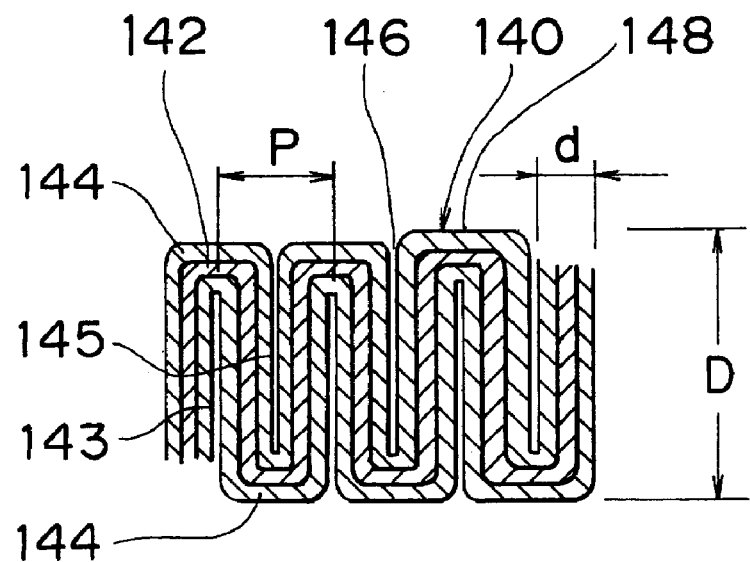
FIG. 28 is an enlarged sectional view showing an essential portion of an energy absorbing member according to the invention shown in FIG. 29, taken on a plane extending in directions of an axis of a part of the energy absorbing member.

The hybrid pipe 140 has a pitch P between adjacent protruded portions 148 (recessed portions 146), an actual thickness d, and an apparent thickness D as indicated in FIG. 28. It has been found that the load-displacement energy absorbing characteristic of a hybrid pipe can be changed by changing any one of the pitch, the actual thickness and the apparent thickness. Moreover, the rising of load and the peak value of load can be adjusted by the great kinetic friction coefficient of the surface member 144 according to the invention.

Figure 29:
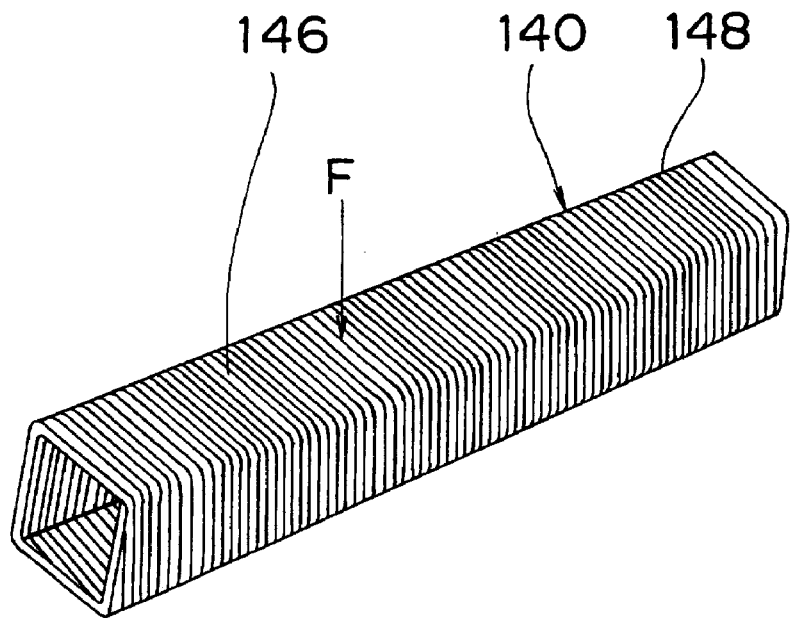
FIG. 29 is a perspective view of the energy absorbing member.

The hybrid pipe 140 is produced normally as follows. That is, a core member 142 and surface members 144 laminated on opposite surfaces of the core member 142 are wound on a spindle to form a cylindrical body. The cylindrical body is then passed through the gap between die rollers so as to form protruded and recessed portions of a predetermined pitch. After that, the pipe is formed into a prism shape as shown in FIG. 29, if necessary. The actual thickness d of the hybrid pipe 140 is determined by selecting the core member 142 and the opposite surface members 144. The pitch P and the apparent thickness D thereof are determined by selecting die rollers for shaping the cylindrical body. The static friction coefficient is determined by selecting the surface members 144. In this manner, a hybrid pipe having predetermined energy absorbing characteristics can be obtained.

Figure 30:
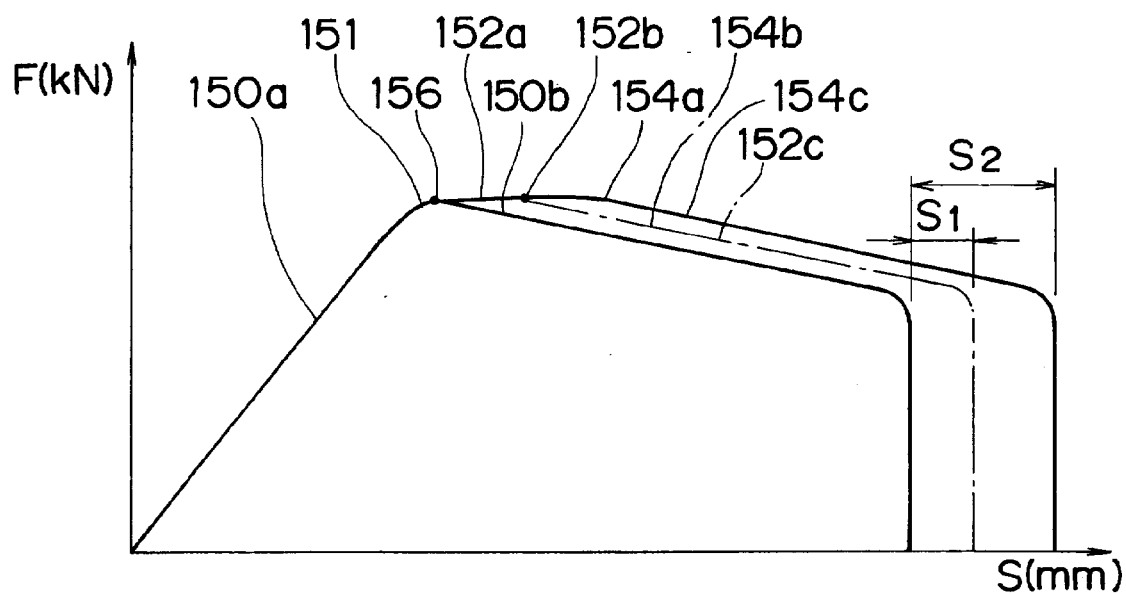
FIG. 30 is a graph indicating load-displacement energy absorbing characteristics.

The graph in FIG. 30 indicates the load(F)-displacement (S) energy absorbing characteristics of three hybrid pipes 150, 152, 154 that have the same actual thickness d, the same apparent thickness D and the same pitch P but that differ from one another in the kinetic friction coefficient of the surface members. In FIG. 30, the amount of energy absorbed by each hybrid pipe before the hybrid pipe is completely compressed is indicated. The surface member's kinetic friction coefficient decreases in the order of the hybrid pipe 154, the hybrid pipe 152 and the hybrid pipe 150. When a load F occurs, the reaction load of the hybrid pipes increases at the same gradient with increases in the displacement until a shape retaining limit 156 is reached. The gradient is indicated by reference character 150a. Up to the shape retaining limit 156, the following changes occur to each hybrid pipe. That is, each hybrid pipe is compressed by a load F so as to deform its sectional shape. Upon deformation of the sectional shape, each of the surface members 144 is slightly forced out in the directions of the axis and brought into close contact with itself so that sliding resistance occurs, at boundaries 143 where the inner peripheral side surface member 144 is folded face to face so that the folded portions become adjacent to each other and at boundaries 145 where the outer peripheral side surface member 144 is folded face to face so that the folded portions become adjacent to each other. Due to the sliding resistance, the apparent thickness is substantially maintained, so that no further displacement in the directions of the axis occurs. The sectional shape is thus retained.

When the load increases so that the shape retaining limit 156 based on the sliding resistance is reached, the reaction load starts decreasing in hybrid pipe 150 as indicated by a line segment 150b since the hybrid pipe 150 has the smallest kinetic friction coefficient of the surface members among the three hybrid pipes, whereas in the hybrid pipes 152, 154, the reaction load substantially remains at a constant value 152a due to their great sliding resistance. More specifically, in the hybrid pipe 150, the sliding between folded portions of each surface member 144 starts and, therefore, the deformation of the hybrid pipe starts, at an early timing. In the hybrid pipes 152, 154, however, the sliding of the surface members 144 does not start yet and, therefore, the deformation of the pipes does not start yet. After a further predetermined amount of displacement, the hybrid pipe 152, having the second smallest kinetic friction coefficient of the surface members, starts to undergo gradual decreases in the reaction load thereof as indicated by a line segment 152c when a shape retaining limit 152b of the hybrid pipe 152 based on the sliding resistance thereof is reached. The hybrid pipe 154, having the greatest kinetic friction coefficient among the three hybrid pipes, still retains a substantially constant reaction load value 154a due to its great sliding resistance. After a further predetermined amount of displacement, the hybrid pipe 154 starts to undergo gradual decreases in the reaction load thereof as indicated by a line segment 154c when a shape retaining limit 154b of the hybrid pipe 154 based on the sliding resistance thereof is reached. In the graph in FIG. 30, there are displacement differences S1, S2 among the hybrid pipes even though they have the same actual thickness d, the same apparent thickness D and the same pitch P. This is because in the graph, the amount of displacement caused by elongation involved in reductions of the apparent thickness of each hybrid pipe is included in the entire amount of displacement of each hybrid pipe in order to indicate the amounts of energy absorbed.

In the characteristic curves shown in FIG. 30, the shape retaining limit 156 is preceded by a peak value 151 of reaction load. Even while the shape of a hybrid pipe is retained, the entire hybrid pipe starts to deform when the reaction load reaches the peak value, which is determined by the apparent thickness of each hybrid pipe, is reached. During the subsequent gradual decrease of reaction load, the shape retaining limit 156 is reached, so that sliding occurs between facing portions of each surface member 144. Therefore, depending on the magnitude of the kinetic friction coefficient of the surface materials, there may also be a case where the shape retaining limit is followed by the peak value of reaction load.

Figure 31:
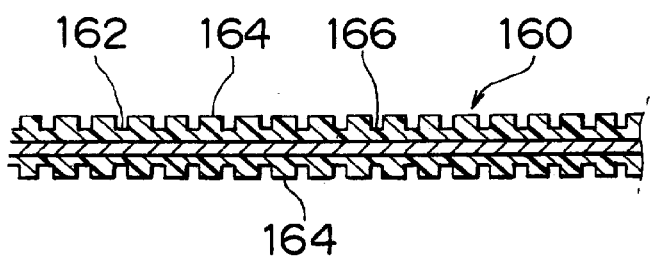
FIG. 31 is a fragmentary sectional view of a core member and surface members of a hybrid pipe for use as an energy absorbing member before they are shaped into the hybrid pipe.
Figure 32:
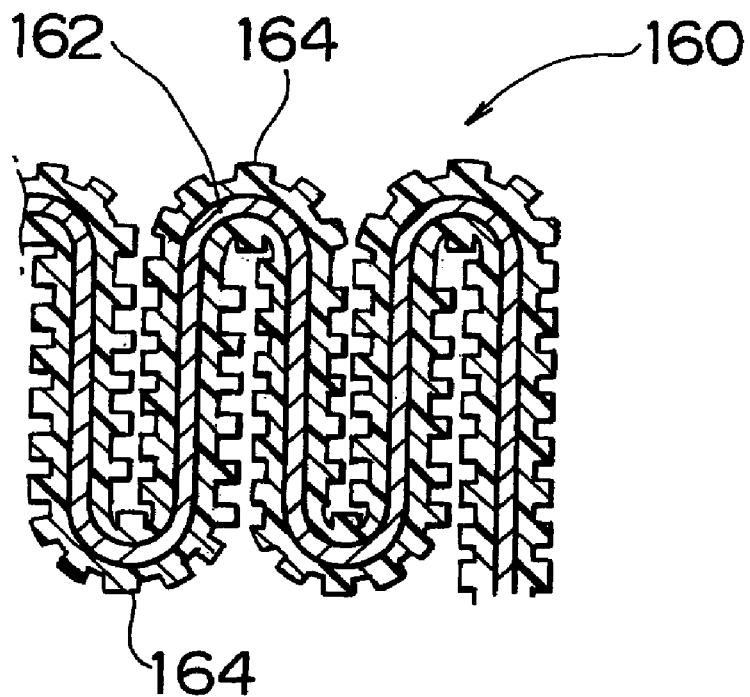
FIG. 32 is an enlarged fragmentary sectional view of the hybrid pipe formed by shaping the core member and the surface members shown in FIG. 31, taken on a plane extending in the directions of the axis of a portion of the hybrid pipe.
Figure 33:
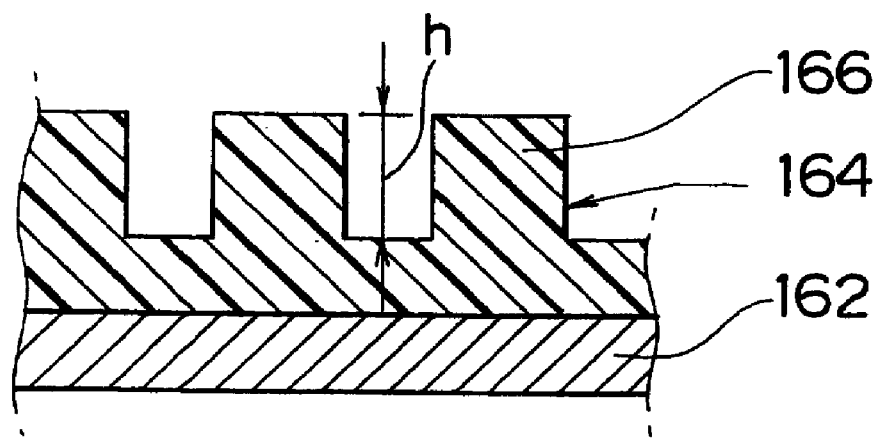
FIG. 33 is an enlarged fragmentary sectional view of a surface member of the hybrid pipe shown in FIG. 32.

FIG. 31 shows a sectional view of a wall of a hybrid pipe 160 before the shaping process. FIGS. 32 and 33 are sectional views of a wall of the hybrid pipe 160. The hybrid pipe 160 is substantially made up of a core member 162 and surface members 164 laminated on and adhered to opposite surfaces of the core member 162. The composite of the core member 162 and the surface members 164 is shaped or corrugated so that protruded and recessed portions are contiguous in directions of the axis of the hybrid pipe 160. A side surface of each surface member 164 remote the core member 162, that is, a surface thereof other than the surface adhered to the core member 162, is formed as a fastener pile surface 166 with small protrusions and recesses. In this embodiment, Microfastener (trademark by Sumitomo 3M) is used for the surface members 164. The flat surface of the fastener is adhered to the core member 162 so that the fastener pile surface 166 is exposed on a side remote from the core member 162. When the fastener pile surface 166 faces and contacts another fastener pile surface, the surfaces interfere with each other and become tentatively fixed so as to produce a great sliding resistance. Moreover, the load-displacement energy absorbing characteristic can be adjusted by changing the density per unit area of the fastener pile surface 166, or changing the length of the fastener pile surface 166 or the height h of protrusions in the fastener pile surface 166.

Figure 34:
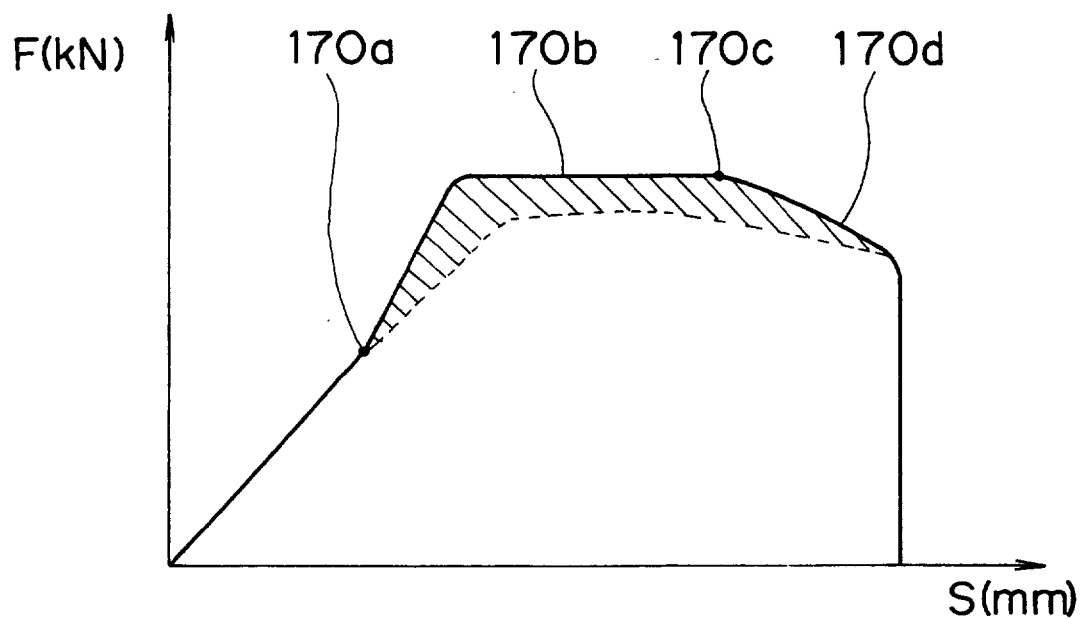
FIG. 34 is a graph indicating energy absorbing characteristics.

FIG. 34 shows a load(F)-displacement(S) energy absorbing characteristic curve. When the sectional shape of the hybrid pipe 160 is slightly deformed by a load acting in a direction intersecting the axis of the pipe, fastener pile surfaces interfere with each other and become tentatively fixed to each other at point 170a on the characteristic curve. Subsequently, the load increases sharply and reaches a peak value, and then the sectional shape is retained so that a characteristic indicated by a line segment 170b is exhibited. The characteristic line segment 170b remains substantially horizontal for a certain amount of displacement because the sliding resistance between the fastener pile surfaces 166 is great. After a shape retaining limit 170c is reached, the fastener pile surfaces 166 are released from the fixed state, so that the sectional shape starts to deform. Due to elongation in the directions of the axis of the pipe, a characteristic indicated by a line segment 170d is exhibited. A hatched area in FIG. 34 indicates an amount of energy absorbed additionally due to the increase in the sliding resistance achieved by the fastener pile surfaces 166.

Figure 35:
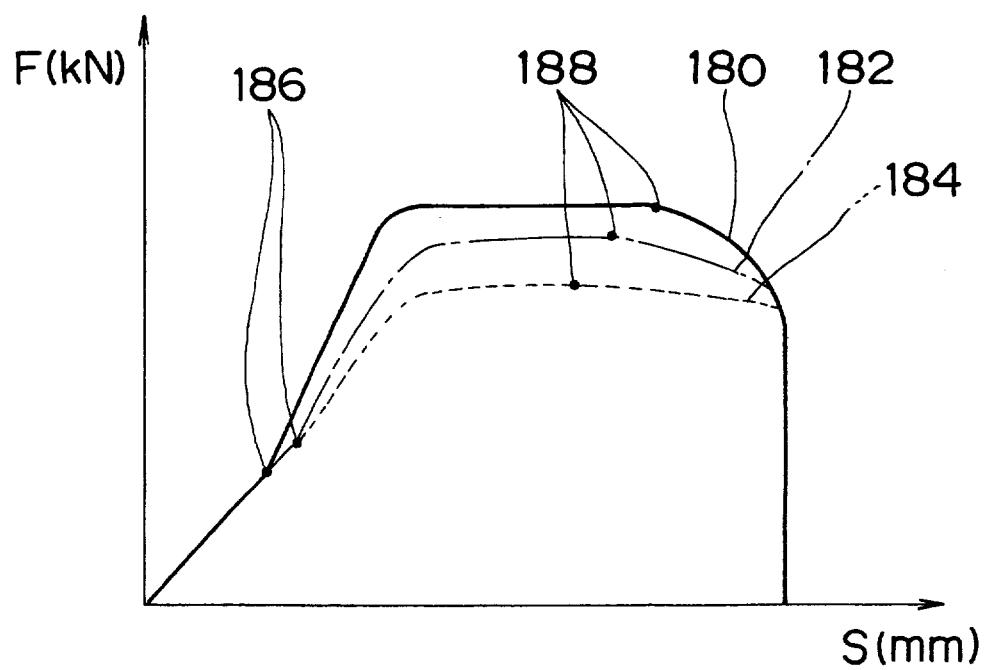
FIG. 35 is a graph indicating energy absorbing characteristics.

FIG. 35 is a graph indicating the load(F)-displacement(S) energy absorbing characteristics of hybrid pipes 180, 182, 184 having the same actual thickness, the same apparent thickness and the same length of fastener pile surfaces 166 but having different densities per unit area of the fastener pile surfaces 166. The density per unit area of the fastener pile surfaces 166 decreases in the order of the hybrid pipe 180, the hybrid pipe 182 and the hybrid pipe 184. With increases in the density per unit area, the peak value becomes higher and the rising of load becomes sharper. The load accelerating point 186 created by the provision of the fastener pile surfaces 166 occurs progressively earlier with increases in the density per unit area of the fastener pile surfaces 166. The load decreasing point 188, at which the fastener pile surfaces 166 become released from the tentative fixed state, occurs progressively later with increases in the density per unit area of the fastener pile surfaces 166.

Figure 36:
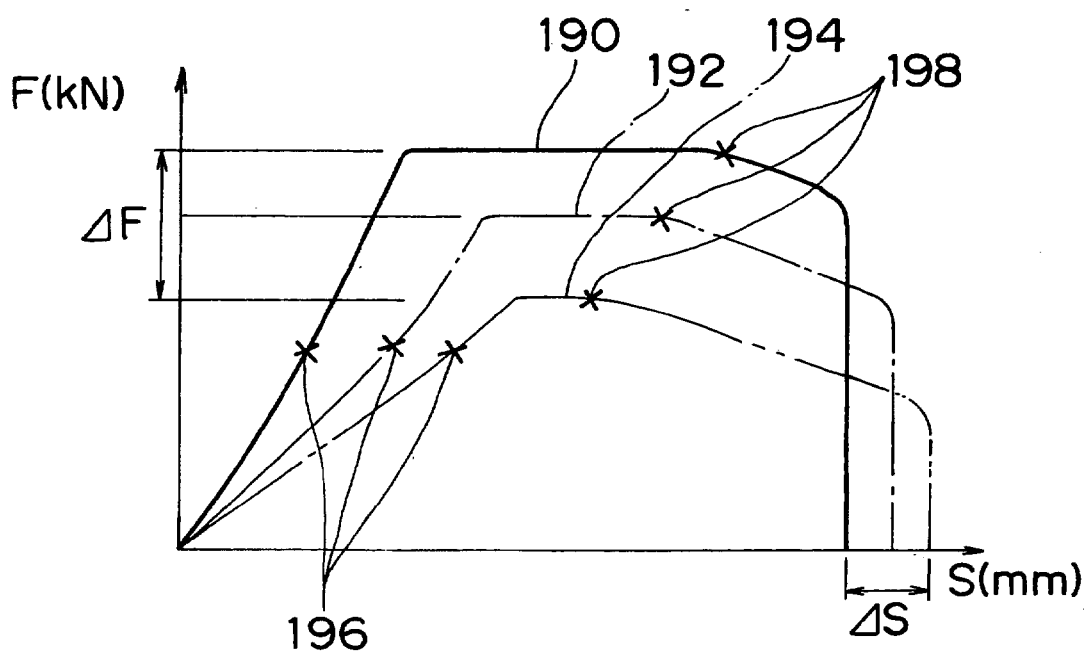
FIG. 36 is a graph indicating energy absorbing characteristics.

FIG. 36 is a graph indicating the load(F)-displacement(S) energy absorbing characteristics of hybrid pipes 190, 192, 194 having the same actual thickness, the same apparent thickness and the same density per unit area of fastener pile surfaces 166 but having different lengths of the fastener pile surfaces 166. The fastener pile surface length decreases in the order of the hybrid pipe 190, the hybrid pipe 192 and the hybrid pipe 194. With increases in the length of the fastener pile surfaces 166, the peak value becomes higher and the rising of load becomes sharper. The load accelerating point 196 created by the provision of the fastener pile surfaces 166 occurs progressively earlier with increases in the length of the fastener pile surfaces 166. The loads occurring to the hybrid pipes 190, 192, 194 at the respective load accelerating points 196 are substantially equal. The load decreasing point 198, at which the fastener pile surfaces 166 become released from the tentative fixed state, occurs progressively later with increases in the length of the fastener pile surfaces 166. The reason why the peak value becomes higher with increases in the length of the fastener pile surfaces 166 is that the actual thickness and the apparent thickness correspondingly increase so that a load increase ΔF occurs. The reason why the effective displacement increases with decreases in the length of the fastener pile surfaces 166 is that the elongation ΔS in the directions of the axis of the pipes increases with decreases in the length of the fastener pile surfaces 166.

A fifth embodiment of the invention will now be described with reference to FIGS. 37 through 40. The basic construction of a hybrid pipe used as an energy absorbing member in this embodiment is substantially the same as shown in FIGS. 3 and 4.

Figure 37:
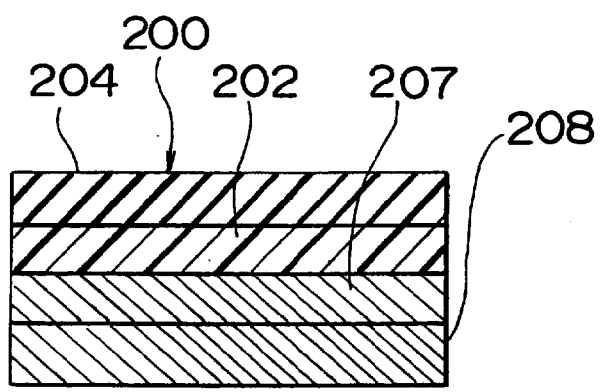
FIG. 37 is a sectional view of an embodiment of a surface member of a hybrid pipe.

A surface member 200 shown in the sectional view in FIG. 37 is formed by a silicone rubber sheet 204 supported on a polyester sheet 202. The polyester sheet 202 carries thereon a layer of an acrylic tackiness agent 207, which is tentatively covered with a peel sheet 208. The surface member 200 can be laminated on a core member by peeling the peel sheet 208 and adhering the tackiness agent layer 207 to the core member. The surface member 200 is a commercially available Scotch Silicone Rubber Tape (trademark by Sumitomo 3M). This tape has the polyester sheet 202, which resists elongation and contraction and facilitates the laminating process. The static friction coefficient of the surface member 200 is 1.2 against a felt and 2.1 against a copying sheet. The kinetic friction coefficient thereof is 1.2 against a felt and 1.9 against a copying sheet.

Figure 38:
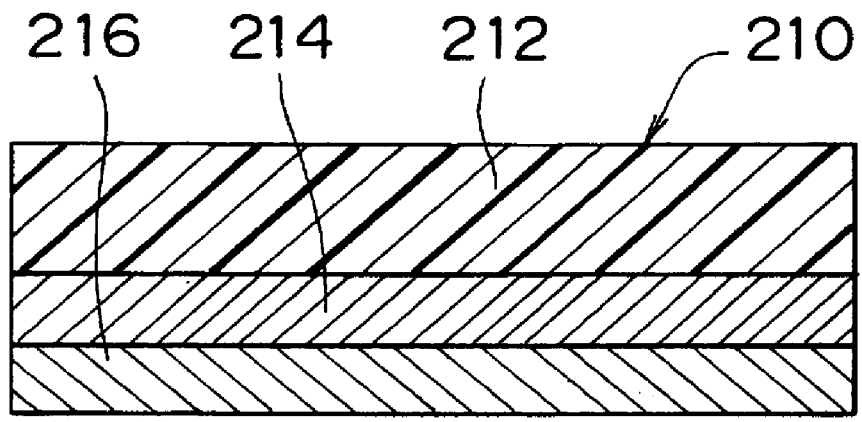
FIG. 38 is a sectional view of another embodiment of a surface member of a hybrid pipe

A surface member 210 shown in the sectional view in FIG. 38 has a polyurethane film 212. The polyurethane film 212 carries thereon a layer of an acrylic tackiness agent 214, which is tentatively covered with a peel sheet 216. The surface member 210 can be laminated on a core member by peeling the peel sheet 216 and adhering the tackiness agent layer 214 to the core member. The surface member 210 is a commercially available High-protection Film Tape SJ8591/SJ8592 (trademark by Sumitomo 3M). This tape is excellent in weather resistance.

Figure 39:
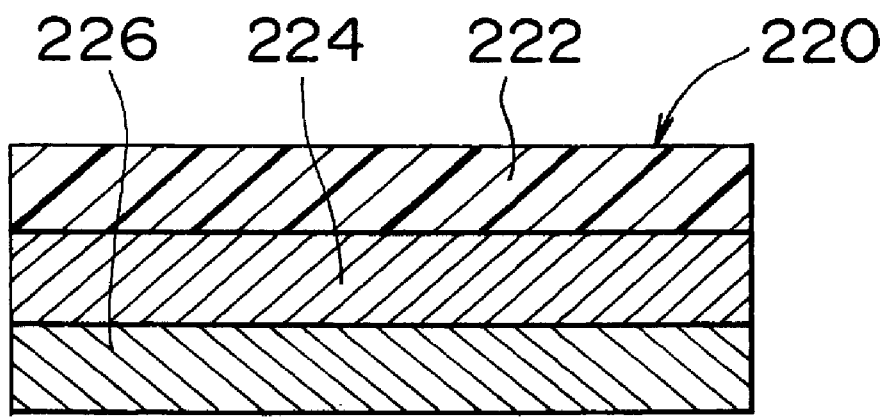
FIG. 39 is a sectional view of still another embodiment of a surface member of a hybrid pipe.

A surface member 220 shown in the sectional view in FIG. 39 has an acrylic film 222. The acrylic film 222 carries thereon a layer of an acrylic tackiness agent 224, which is tentatively covered with a peel sheet 226. The surface member 220 can be laminated on a core member by peeling the peel sheet 226 and adhering the tackiness agent layer 224 to the core member. The surface member 220 is a commercially available #9638 Easy Stretch Tape (trademark by Sumitomo 3M). This tape highly readily stretches.

Figure 40:
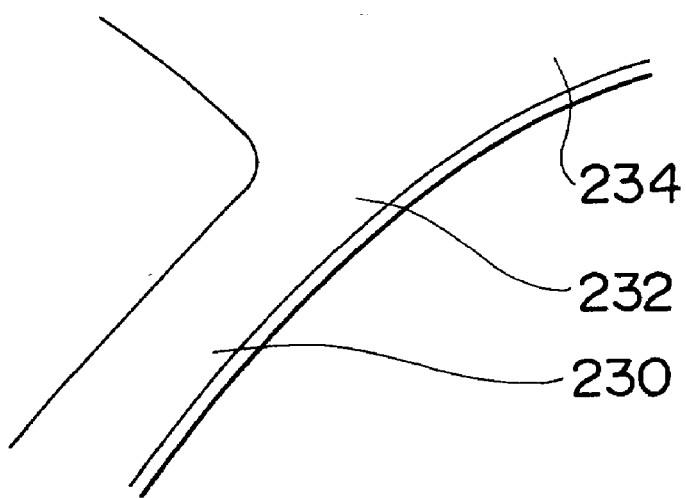
FIG. 40 is a perspective view of a vehicle body structure member preferable for application of an impact energy absorbing structure in an upper vehicle body portion according to the invention.

The energy absorbing member formed by the hybrid pipe may be disposed in a peculiar location, such as a connecting portion 232 between a front pillar 230 and a roof side rail 234 as shown in FIG. 40. The front pillar 230 and the roof side rail 234 are curved two-dimensionally as shown in FIG. 40, and also curved in a direction perpendicular to the plane of the sheet of FIG. 40. That is, the front pillar 230 and the roof side rail 234 are three-dimensionally curved. On the other hand, the interior trim, that is, a roof lining, is not three-dimensionally curved to conform to the shapes of the front pillar 230 and the roof side rail 234. Therefore, the interval therebetween into which an impact energy absorbing member is to be disposed varies in size. The energy absorbing member is formed by a hybrid pipe and therefore easy to bend, and the energy absorbing characteristics thereof can be adjusted by changing the apparent thickness thereof. Consequently, it is possible to dispose in the size-varying interval an energy absorbing member that appropriately absorbs energy in accordance with the interval sizes.

A sixth embodiment of the invention will be described with reference to FIGS. 41 through 51. The basic construction of a hybrid pipe used as an energy absorbing member in this embodiment is substantially the same as shown in FIGS. 3 and 4.

Figure 41:
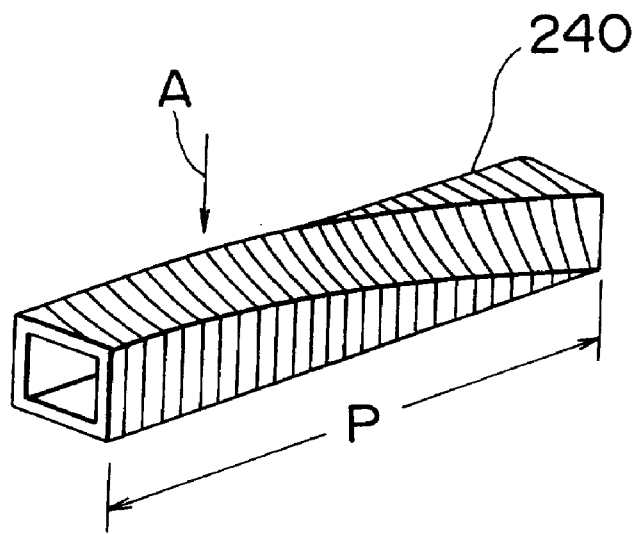
FIG. 41 is a perspective view of a further embodiment of an energy absorbing member used in an impact energy absorbing structure in an upper vehicle body portion according to the invention.

An energy absorbing member 240 shown in the perspective view in FIG. 41 is formed by a hybrid pipe twisted about an axis thereof.

The twisted hybrid pipe 240 is disposed so that the hybrid pipe 240 receives an impact load as indicated by arrow A in FIG. 41.

Figure 42:
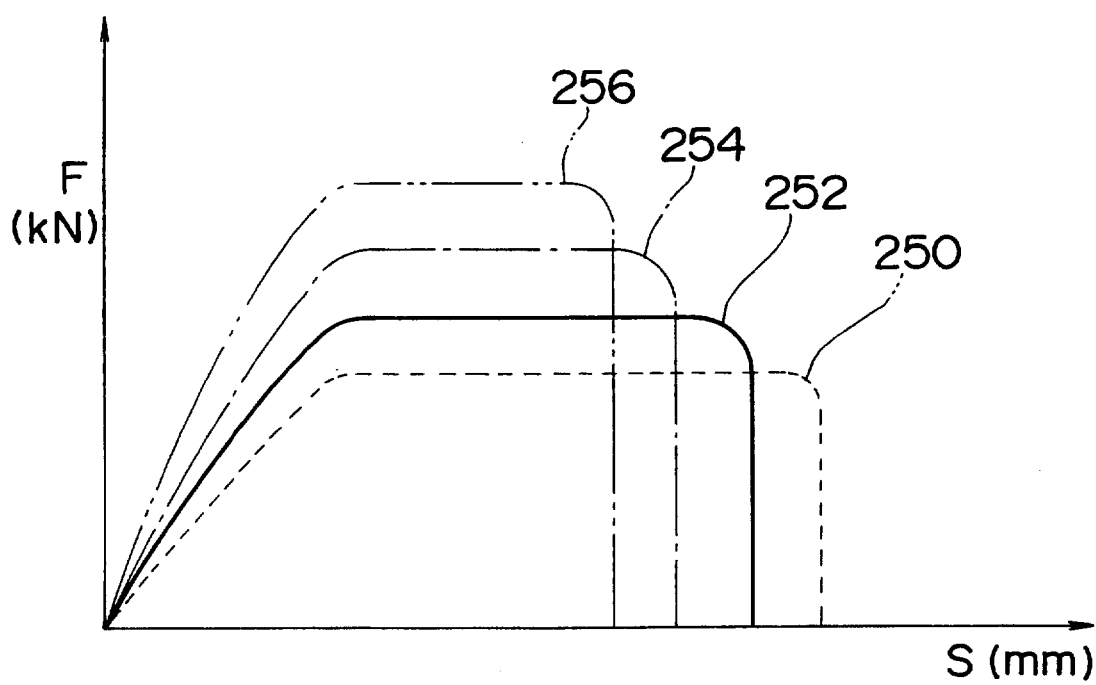
FIG. 42 is a graph indicating load-displacement energy absorbing characteristics.

The hybrid pipe 240 shown in FIG. 41 has a twist pitch P. By varying the twist pitch P, the energy absorbing characteristics of the hybrid pipe 240 can be adjusted. FIG. 42 is a graph indicating the load(F)-displacement(S) energy absorbing characteristics of an untwisted hybrid pipe 250 and twisted hybrid pipes 252, 254, 256. The rising of load is sharper in the twisted hybrid pipes 252, 254, 256 than in the untwisted hybrid pipe 250. The length of the twist pitch P decreases in the order of the hybrid pipe 252, the hybrid pipe 254 and the hybrid pipe 256. Therefore, it can be understood that with decreases in the twist pitch P, the rising of load becomes sharper and the displacement becomes smaller.

It has been found that as the twist angle of the hybrid pipe 240 is increased, the rising of load becomes sharper and the displacement becomes smaller. Therefore, the energy absorbing characteristics of the hybrid pipe 240 can be varied by changing at least one of the twist angle and the twist pitch P of the hybrid pipe 240. This variation is continuous so that the energy absorbing characteristics can be finely adjusted by changing the amount of twist (that is, twist angle, twist pitch and the like).

A If the hybrid pipe 240 has a quadrilateral sectional shape as shown in FIG. 41, the hybrid pipe 240 can easily be adhered to the interior trim. In particular, if the sheet members 44 laminated on the opposite surfaces of the core member 42 (FIG. 3) of the hybrid pipe 240 are made of paper, the adhesion of the hybrid pipe 240 to the interior trim is easy, and a high adhesion strength can be achieved. Furthermore, if the hybrid pipe 240 is adhered to the interior trim in advance, that is, if the hybrid pipe 240 and the interior trim are prepared as a sub-assembly, the mounting of the hybrid pipe and the interior trim to a vehicle body becomes easy.

Figure 43:
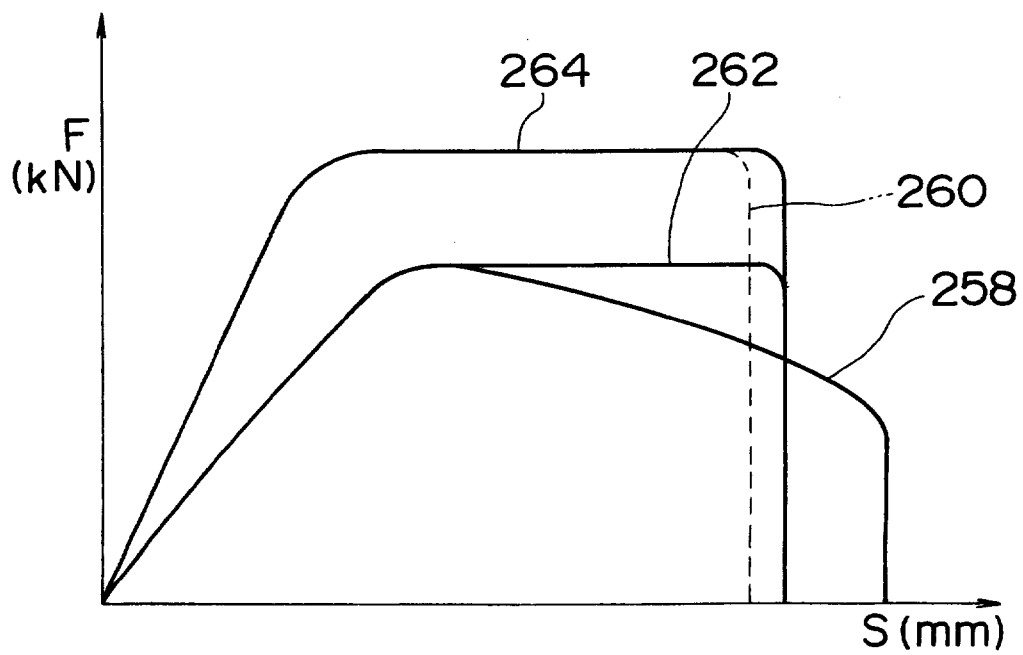
FIG. 43 is a graph indicating load-displacement energy absorbing characteristics.
Figure 44:
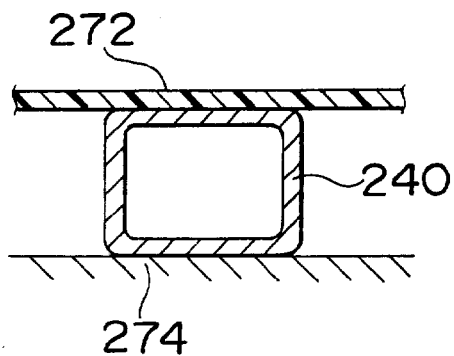
FIG. 44 is a sectional view of an impact energy absorbing structure, illustrating an adhered site.
Figure 45:
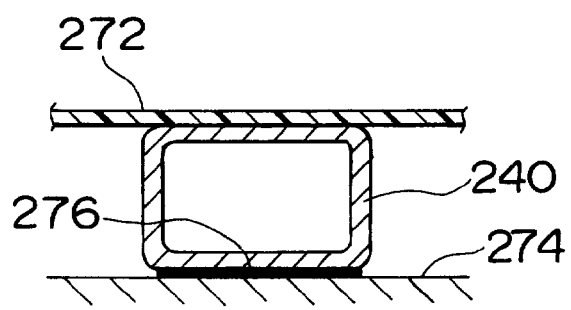
FIG. 45 is a sectional view of an impact energy absorbing structure, illustrating an adhered site in an adhered condition different from that shown in FIG. 44.
Figure 46:
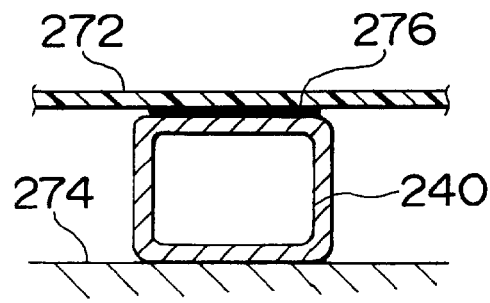
FIG. 46 is a sectional view of an impact energy absorbing structure, illustrating an adhered site in an adhered condition different from those shown in FIGS. 44 and 45.

FIG. 43 shows the load(F)-displacement(S) energy absorbing characteristic curves 258, 262, 264 achieved by three hybrid pipes 240 mounted in different manners. The characteristic curve 258 is achieved by the hybrid pipe 240 disposed between a rigid wall (structural member) 274 and a platy member (interior trim) 272 in a completely free (not adhered) condition as shown in FIG. 44. The characteristic curve 262 is achieved by the hybrid pipe 240 adhered to the rigid wall 274 by an adhesive 276 in entire face adhesion as shown in FIG. 45. The characteristic curve 264 is achieved by the hybrid pipe 240 adhered to the platy member 272 by an adhesive 274 in entire face adhesion as shown in FIG. 46. The characteristic curve 258 of the free-state (not adhered) hybrid pipe 240 has a low or gentle rising of load and the greatest displacement among the three characteristic curves. The characteristic curve 262 of the hybrid pipe 240 adhered to the rigid wall 274 has the same rising of load as that of the characteristic curve 260 of the free-state hybrid pipe 240, and then remains at a maximum load, and has a lesser displacement than the characteristic curve 258 of the free-state hybrid pipe 240. The characteristic curve 264 of the hybrid pipe 240 adhered to the platy member 272 has a sharper rising of load than the other two, and the same displacement as that of the characteristic curve 262 of the hybrid pipe 240 adhered to the rigid wall 274. Therefore, it can be understood that by adhering the hybrid pipe 240 to a structural member or an interior trim, energy absorbing characteristics with a sharper rising of load and a lesser displacement can be achieved.

If the hybrid pipe 240 is adhered to an interior trim, the energy absorbing characteristics can be changed by changing at least one of the adhered area and the adhered site of the hybrid pipe 240.

Figure 47:
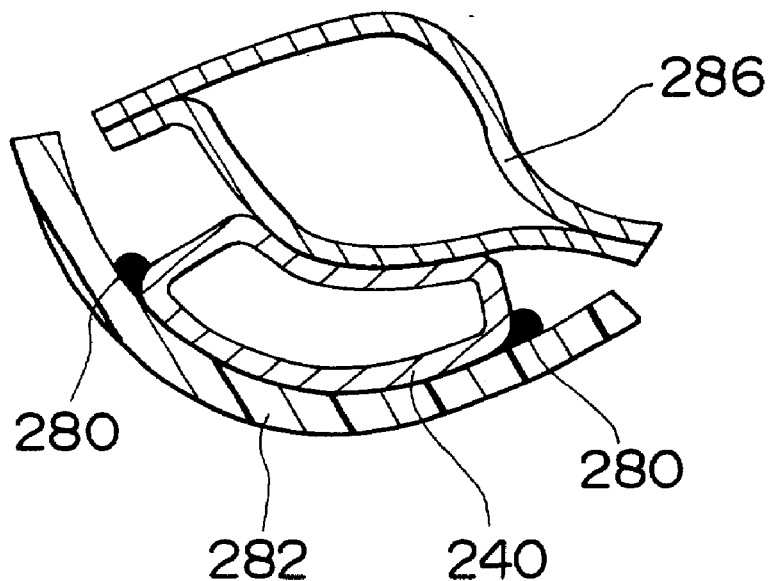
FIG. 47 is a sectional view illustrating adhered sites.
Figure 48:
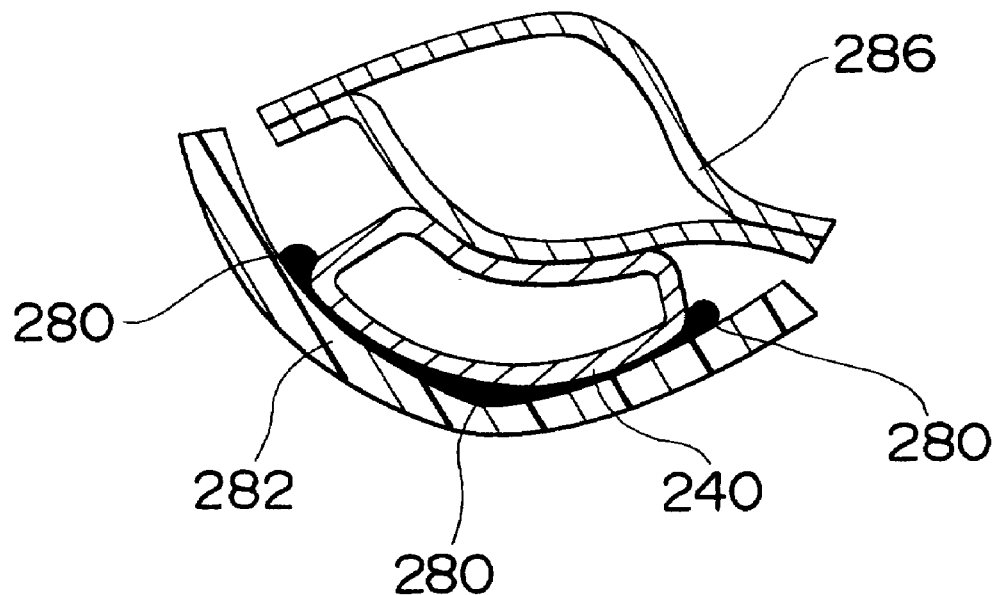
FIG. 48 is a sectional view illustrating adhered sites in an adhered condition different from that shown in FIG. 47.

As the adhered area increases, the restraining force on the hybrid pipe 240 provided by the interior trim increases, so that the rising of load becomes sharper. Furthermore, the elongation in the directions of the axis of the hybrid pipe changes depending on whether the adhered site is at an end of the hybrid pipe or an intermediate portion thereof in the directions of the axis. Therefore, the rising of load can be changed on the basis of the adhered site. Furthermore, the adhered area of the hybrid pipe 240 can be changed and, therefore, the rising of load can be changed, on the basis of whether an adhesive 280 is applied to two sites in the hybrid pipe 240 as indicated in FIG. 47, that is, two opposite end sites in a section of the pipe taken on a plane intersecting the axis of the pipe, or applied to three sites as indicated in FIG. 48, that is, the two opposite end sites and one intermediate site in a section of the pipe taken on a plane intersecting the axis of the pipe.

Figure 49:
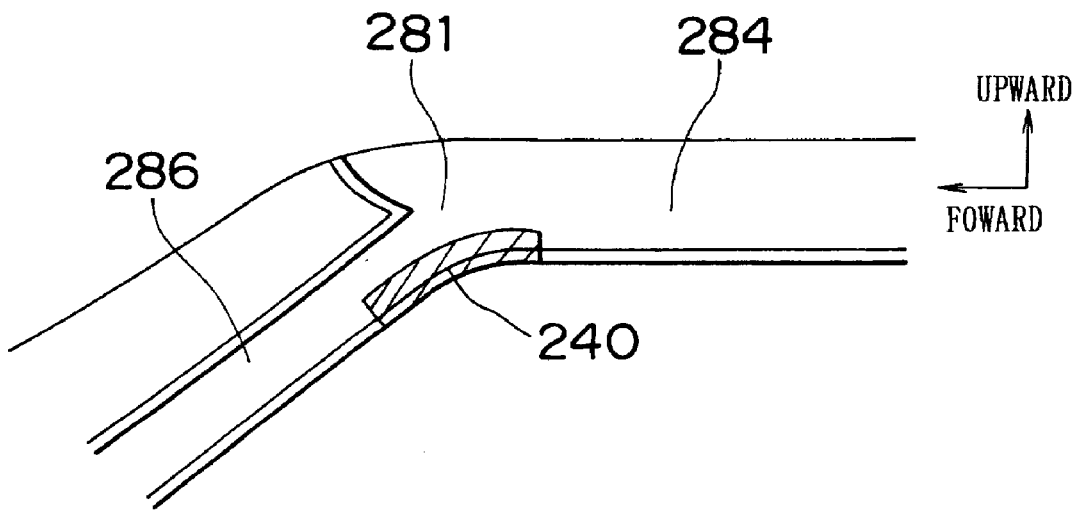
FIG. 49 is a side view of a forward portion of a vehicle body, illustrating a site to which an impact energy absorbing structure in an upper vehicle body portion according to the invention is applicable.
Figure 50:
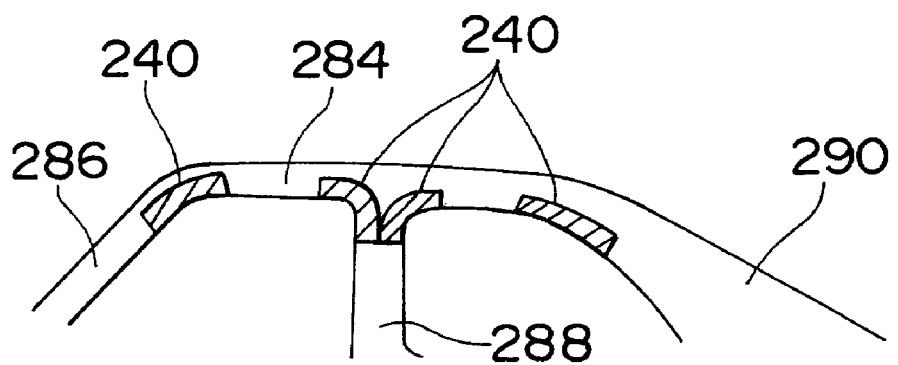
FIG. 50 is a side view of a whole upper vehicle body portion, illustrating sites to which an impact energy absorbing structure in an upper vehicle body portion according to the invention is applicable.

If the structural member is formed by a front pillar 286 and a roof side rail 284 as shown in FIG. 49, the hybrid pipe 240 can be disposed at an intersecting portion 281 between the front pillar 286 and the roof side rail 284. Similarly, the hybrid pipe 240 can also be disposed at an intersecting portion as shown in FIG. 50, that is, an intersecting portion between a center pillar 288 and the roof side rail 284, or an intersecting portion between a quarter pillar 290 and the roof side rail 284.

Figure 51:
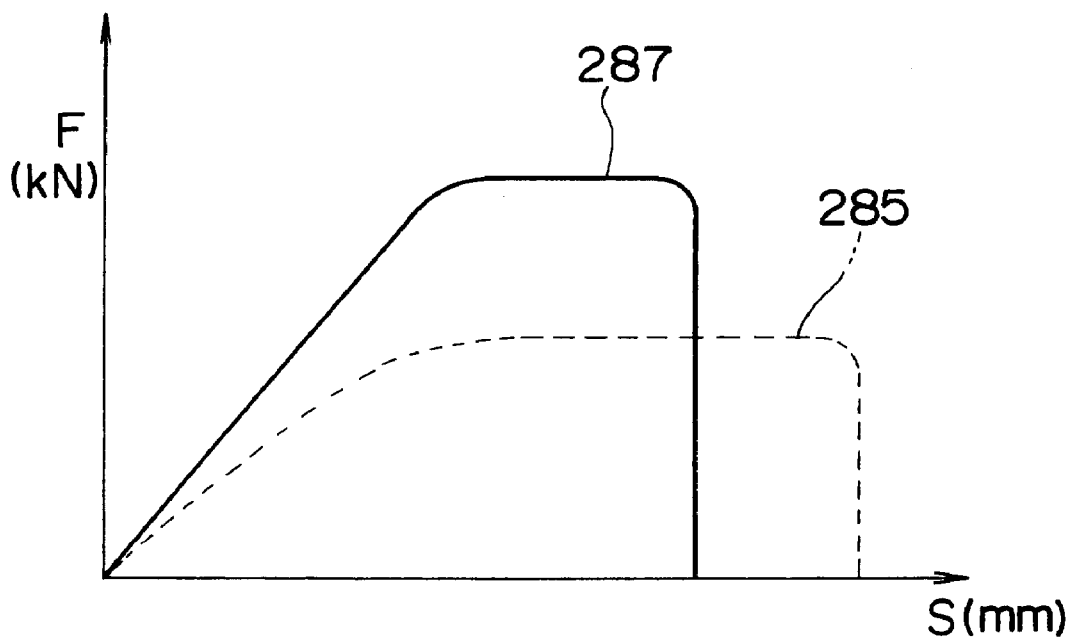
FIG. 51 is a graph indicating load-displacement energy absorbing characteristics.

FIG. 51 shows load(F)-displacement(S) energy absorbing characteristic curves. If a hybrid pipe is disposed along the front pillar 286, a load(F)-displacement(S) energy absorbing characteristic with a gentle rising of load and a great displacement as indicated by a curve 285 may be set because a great displacement is allowed at a site adjacent to the front pillar 286. If a hybrid pipe is disposed at the intersecting portion 281 between the front pillar 286 and the roof side rail 284, a load(F)-displacement(S) energy absorbing characteristic with a sharp rising of load and a small displacement as indicated by a curve 287 is required because the effective displacement length at the intersecting portion 281 is short. As can be understood from the foregoing description, the hybrid pipe 240, which is twisted about its axis, meets the requirements for installation at the intersecting portion 281. It is also useful to dispose a hybrid pipe or an aluminum pipe twisted about its axis at the intersecting portion between the center pillar 288 and the roof side rail 284 or the intersecting portion between the quarter pillar 290 and the roof side rail 284 as shown in FIG. 50, because the effective displacement length is also short at the intersecting portions.

A seventh embodiment of the invention will be described with reference to FIGS. 52 through 62.

Figure 52:
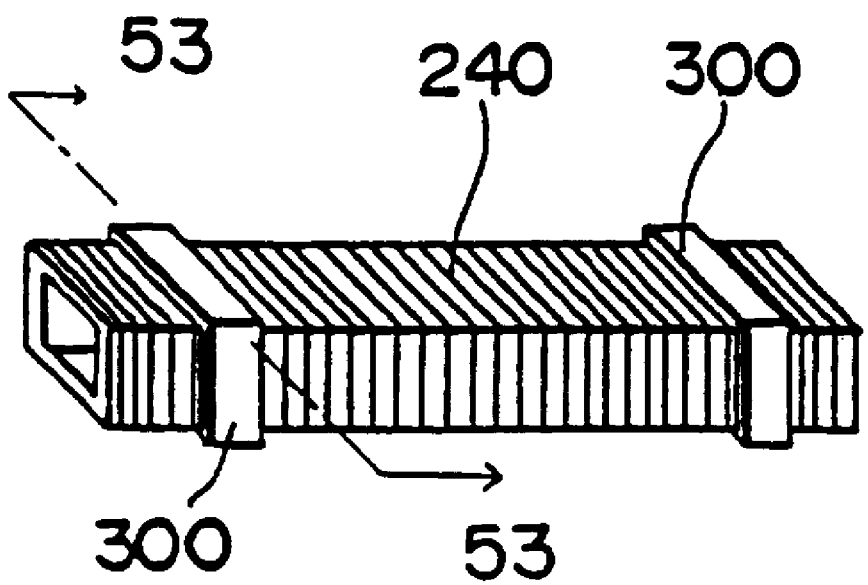
FIG. 52 is a perspective view illustrating a device for fastening the energy absorbing member shown in FIG. 4, 29, or 41.
Figure 53:
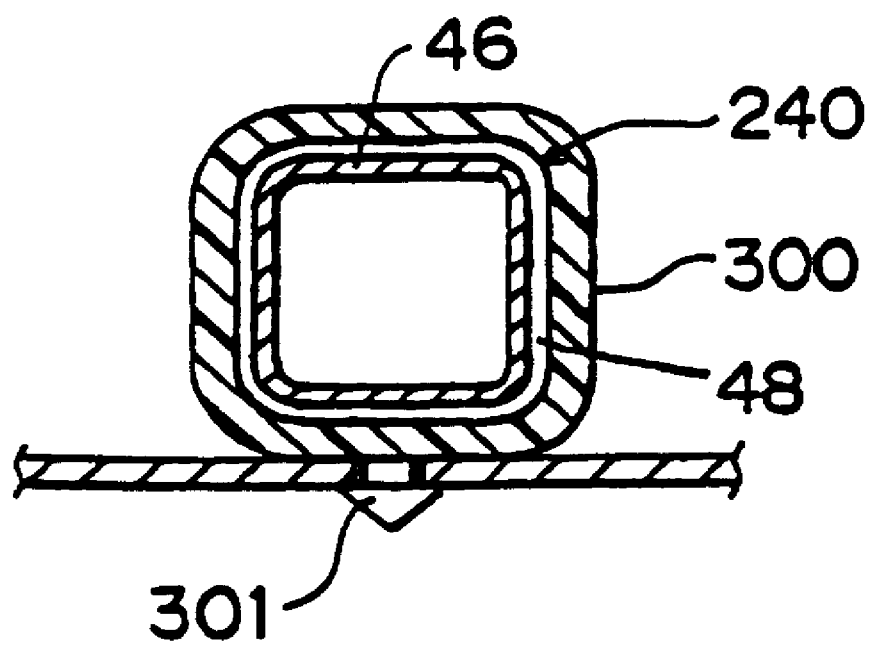
FIG. 53 is a sectional view taken along line 53—53 illustrating the device for fastening the energy absorbing member shown in FIG. 52.

A hybrid pipe 240 according to this embodiment has two bands 300 extending around opposite end portions of the pipe as shown in the perspective view in FIG. 52. The bands 300 are used to mount the hybrid pipe 240 to a structural member or an interior trim. Each band 300 can be mounted to the structural member or the interior trim, for example, as shown in FIG. 53, that is, by fitting a hook 301 provided integrally with the band 300 into a hole formed in the structural member or the interior trim. The fastening of the hybrid pipe 240 by using the bands 300 is accomplished in such a manner that the hybrid pipe 240 is retained at a predetermined position but is not impeded from elongating in the directions of its axis. Therefore, upon receiving an impact load, the hybrid pipe 240 elongates, that is, changes from an original state as shown in the sectional view in FIG. 56 to an elongated state as shown in the sectional view in FIG. 57, so that the apparent thickness of the hybrid pipe 240 changes (decreases). Consequently, the energy absorbing characteristics can be adjusted.

Figure 54:
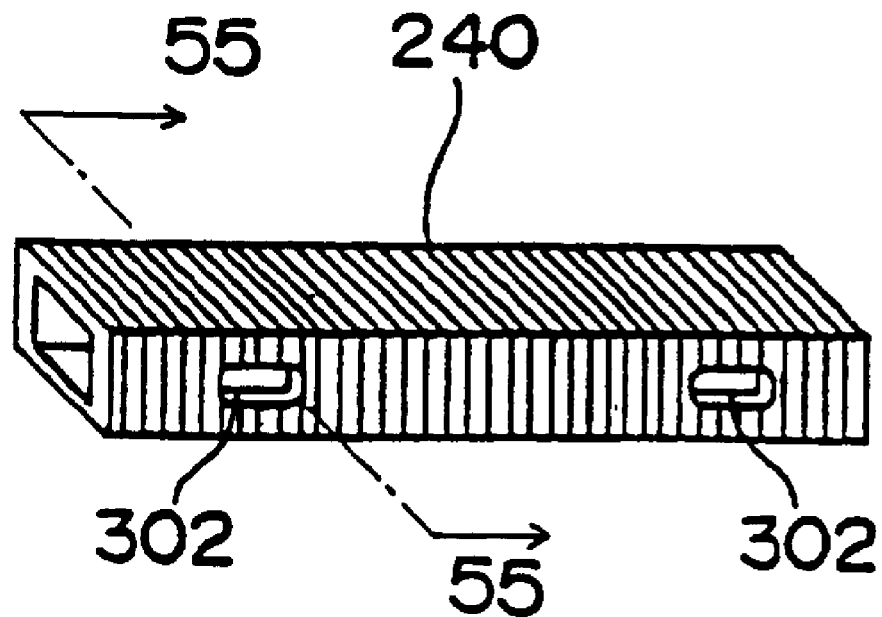
FIG. 54 is a perspective view illustrating another device for fastening the energy absorbing member shown in FIG. 4, 29, or 41.
Figure 55:
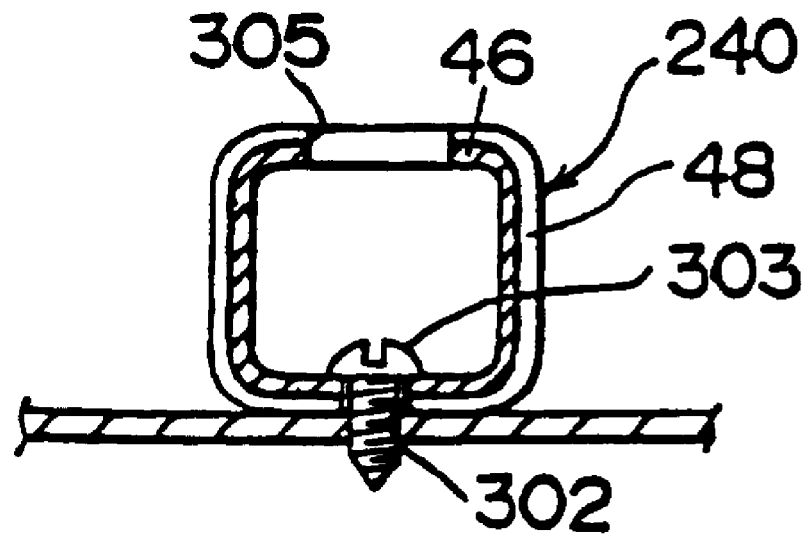
FIG. 55 is a sectional view taken along line 55—55 illustrating the device for fastening the energy absorbing member shown in FIG. 54.
Figure 56:
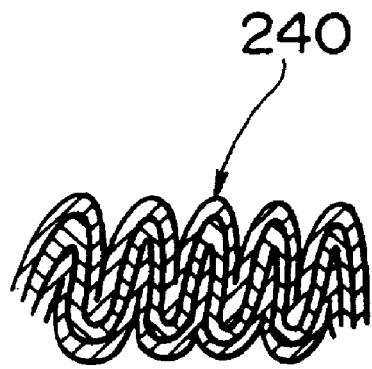
FIG. 56 is a sectional view of a portion of the energy absorbing member shown in FIG. 4, 29, or 41, illustrating a state thereof before the energy absorbing member is deformed and elongated.
Figure 57:
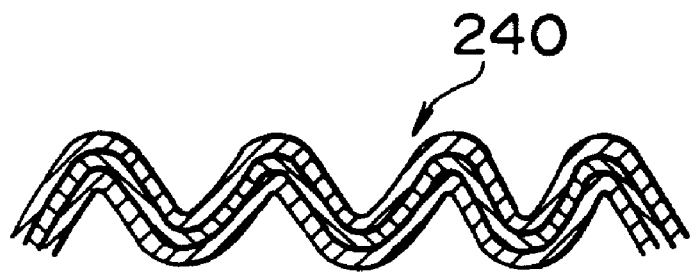
FIG. 57 is a sectional view of a portion of the energy absorbing member shown in FIG. 4, 29, or 41, illustrating a state thereof after the energy absorbing member is deformed and elongated.
Figure 58:
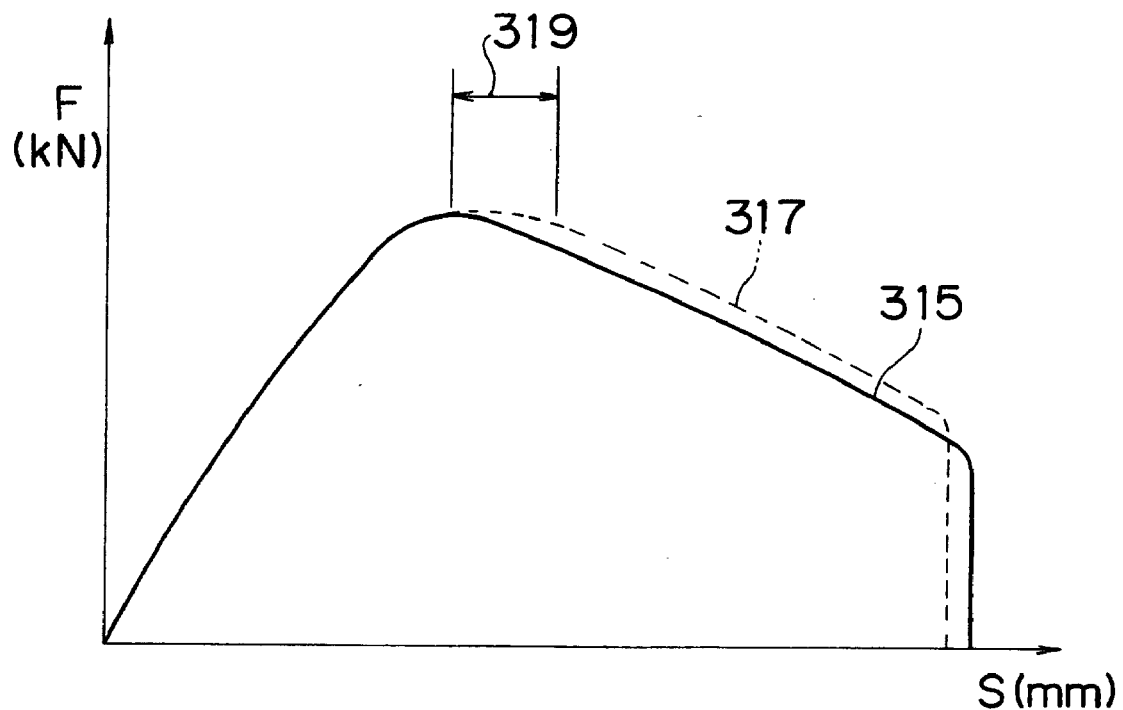
FIG. 58 is a graph indicating load-displacement energy absorbing characteristics.
Figure 59:
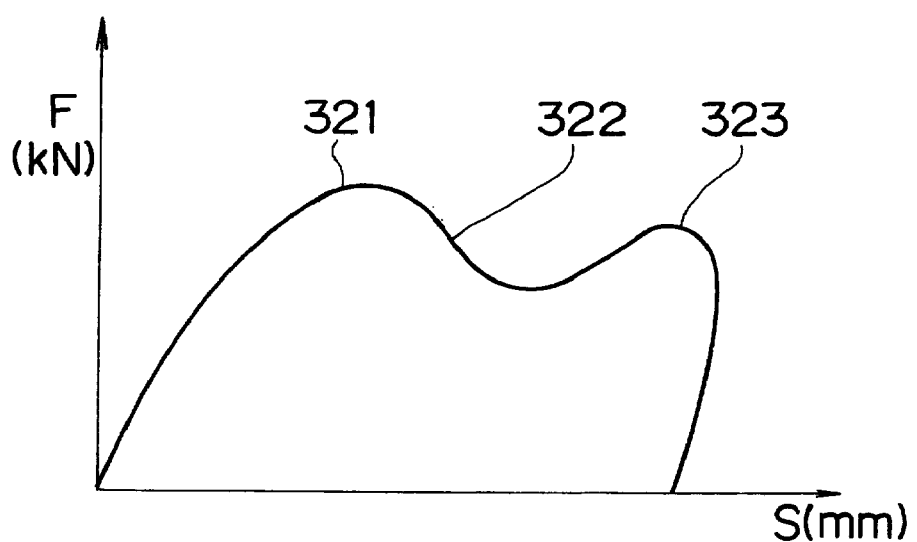
FIG. 59 is a graph indicating load-displacement energy absorbing characteristics.
Figure 60:
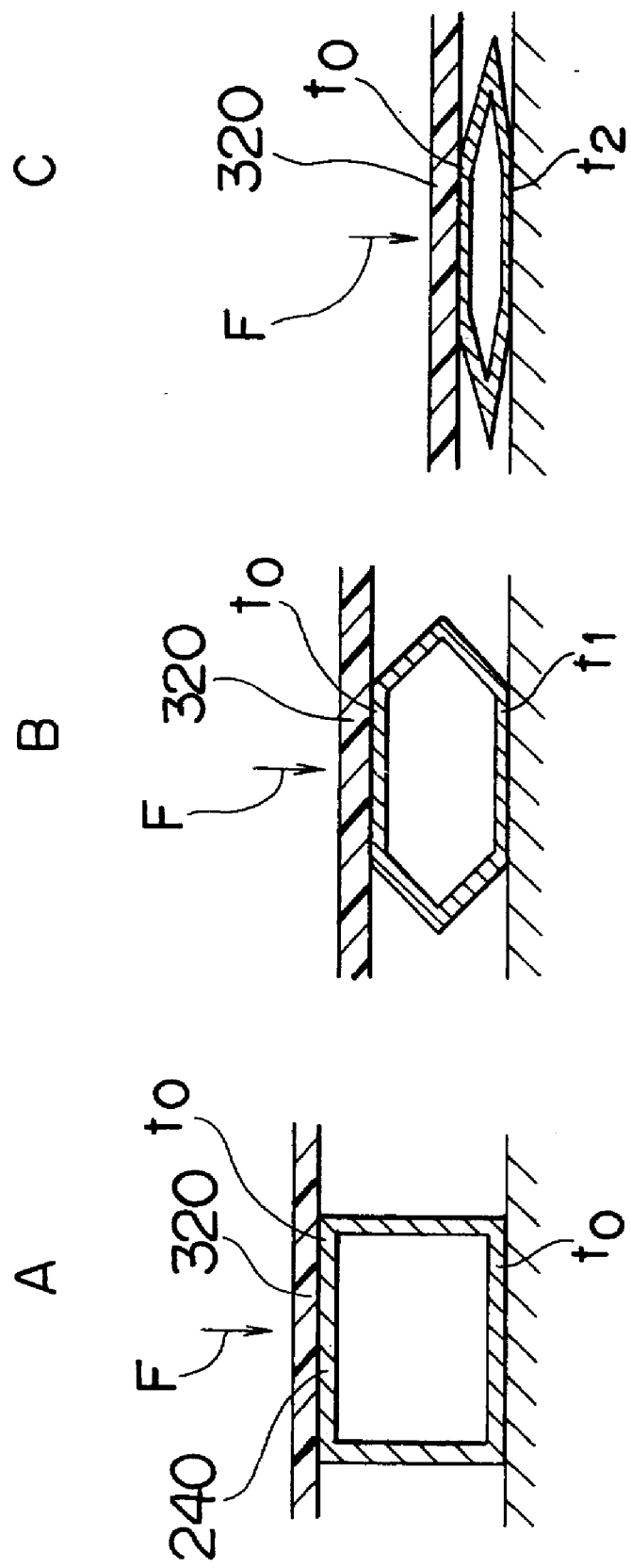
FIGS. 60A, 60B and 60C are sectional views of an impact energy absorbing structure, illustrating different states that are undergone by the energy absorbing member shown in FIG. 4, 29, or 41 when it deforms.
Figure 61:
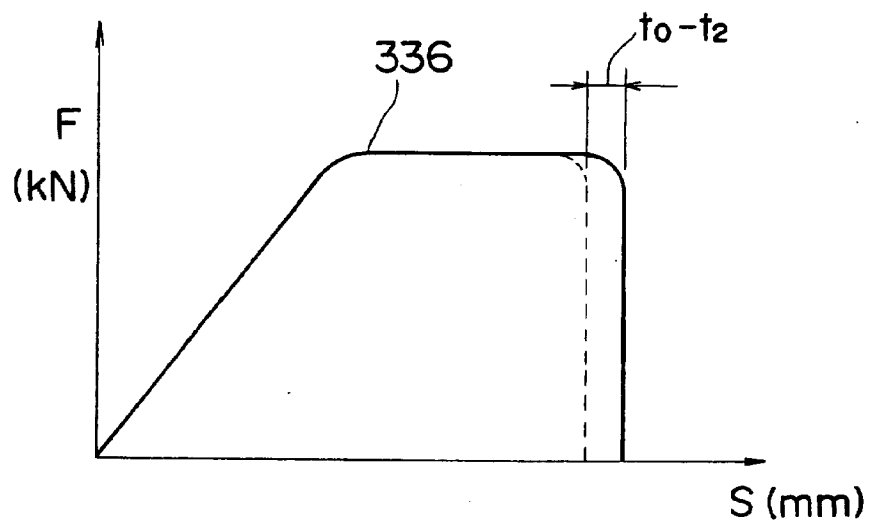
FIG. 61 is a graph indicating load-displacement energy absorbing characteristics.
Figure 62:
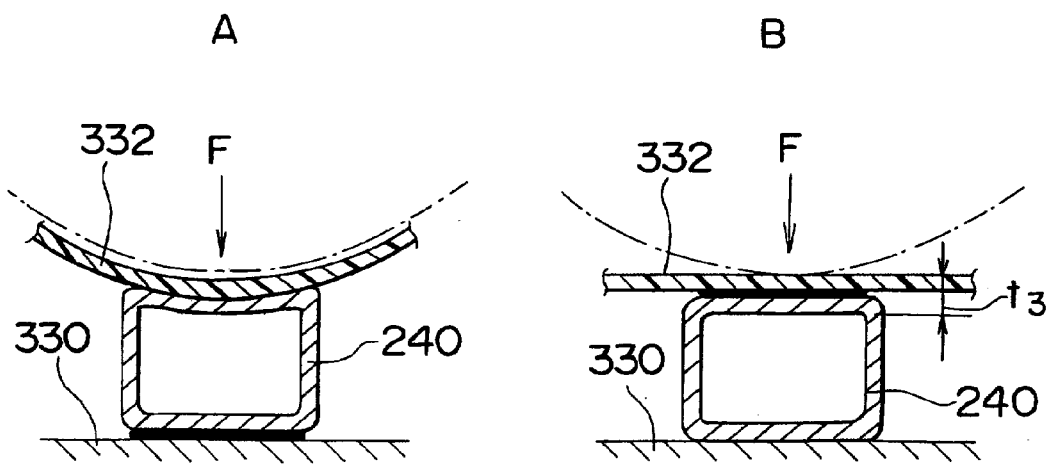
FIGS. 62A and 62B are schematic illustrations of the operation of the energy absorbing member shown in FIGS. 45 and 46.

The hybrid pipe 240 may also have elongated holes 302 near opposite ends of the pipe, and relatively large insert holes 305 that respectively face the two elongated holes 302, as shown in FIGS. 54 and 55. The hybrid pipe 240 is fastened to a structural member or an interior trim by bringing a tapping screw 303 to each elongated hole 302 through the corresponding insert hole 305 and screwing it into the structural member or the interior trim through the elongated hole 302. The length of each elongated hole 302 is predetermined so that the hole edge does not interfere with the tapping screw 303 when the hybrid pipe 240 is elongated in the directions of the axis by an impact load. The fastening force by the tapping screws 303 needs to be adjusted beforehand so as to restrain the hybrid pipe from elongating in the directions of the axis during an initial period but allow relative sliding between the tapping screws 303 and the elongated hole portions 302 at a certain time point. FIG. 58 shows load(F)-displacement(S) energy absorbing characteristic curves. The fastening of the hybrid pipe using the bands 300 achieves an energy absorbing characteristic as indicated by a curve 315. The fastening using the tapping screws 303 achieves an energy absorbing characteristic as indicated by a curve 317. The fastening of the hybrid pipe using the tapping screws secures a range of displacement 319 in which a load is maintained, that is, kept from falling. More specifically, the fastening of the hybrid pipe 240 using the tapping screws 303 causes friction between the hybrid pipe 240 and the counter-member, so that while the friction restrains the hybrid pipe 240 from elongating in the directions of the axis, a load reduction due to axial elongation of the hybrid pipe 240 does not occur.

The hybrid pipe 240 can also be fastened in such a manner that when the axial elongation of the hybrid pipe 240 reaches a predetermined amount, the axial elongation is restrained.

Referring back to FIGS. 54 and 55, the tapping screws 303 are placed on the outward-side ends of the elongated holes 302 in the directions of the axis of the hybrid pipe 240, that is, on a right-side end of the right-side elongated hole 302 and a left-side end of the left-side elongated hole 302. The fastening force by the tapping screws 303 is adjusted beforehand so as to restrain the hybrid pipe from elongating in the directions of the axis during an initial period following an impact but allow relative sliding between the tapping screws 303 and the elongated holes 302 at a certain time point. Referring to the load(F) -displacement (S) energy absorbing characteristic curve shown in FIG. 59, the load rises to a peak value 321 before an elongated hole portion 302 starts to slide relative to the tapping screw 303. While the hybrid pipe 240 elongates with relative sliding between the tapping screw or screws 303 and the elongated hole or portions 302, the load reduces as indicated by a line segment 322. When the tapping screws 303 reach the inward ends of the elongated holes 302, the elongation of the hybrid pipe is restrained, so that the load increases again and reaches another peak value 323. Thus, a two-peak energy absorbing characteristic curve is obtained. Therefore, an average load can be reduced.

The hybrid pipe 240 may have a polygonal sectional shape and may be adhered to an interior trim. In this case, the energy absorbing characteristics can be changed by changing at least one of the adhered area and the adhered site of the hybrid pipe 240.

Referring back to FIG. 43, it is indicated that the energy absorbing characteristics can be adjusted by adhering the hybrid pipe 240 to an interior trim. This will be explained in detail with reference to the sectional views of FIGS. 60A, 60B and 60C. The thickness t0 of the hybrid pipe 240 is uniform before an impact load acts on an interior trim 320 as indicated by arrow F (see FIG. 60A). When an impact load F occurs on the interior trim 320 so that the hybrid pipe 240 partially deforms, a portion of the hybrid pipe adhered to the interior trim 320 retains the thickness t0 because the adhered portion does not elongate, whereas the other portion elongates in the directions of the axis of the pipe so that the thickness reduces from the thickness t0 to a thickness t1 (FIG. 60B) . As the hybrid pipe 240 further deforms, the portion adhered to the interior trim 320 retains the thickness t0 whereas the thickness of the other portion reduces from the thickness t1 to a thickness t2 due to further axial elongation (FIG. 60C). In this manner, the apparent thickness of the hybrid pipe 240 reduces with increases in displacement, so that the non-compressed portion of the hybrid pipe 240 reduces. Therefore, as indicated in the load(F)-displacement(S) energy absorbing characteristic graph in FIG. 61, the characteristic curve 336 achieved by the hybrid pipe 240 adhered to the interior trim 320 has an apparent displacement that is longer by an amount t0–t2 than an energy absorbing characteristic curve achieved by a metal pipe which has a thickness t0.

If the hybrid pipe 240 is adhered to an interior trim, energy absorbing characteristics with a sharper rising of load can be achieved. In a case where the hybrid pipe 240 having a plate thickness t0 is disposed between an interior trim 332 and a structural member 330 and adhered to the structural member 330 as shown in FIG. 62A, an impact load as indicated by arrow F curves the impacted face portion on the side of the interior trim 332 before deforming the sectional shape of the hybrid pipe 240. Therefore, the rising of load becomes gentle. In contrast, in a case where the hybrid pipe 240 is adhered to the interior trim 332 as shown in FIG. 62B, the impacted face portion has an apparent plate thickness t3 equal to the sum of the plate thickness of the hybrid pipe 240 and the plate thickness of the interior trim, so that the curving deformation prior to the sectional shape deformation reduces. Therefore, the rising of load becomes sharper in the structure shown in FIG. 62B.

In all the foregoing embodiments, a wire harness or the like may be inserted through the hybrid pipe 240.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An impact energy absorbing structure in an upper vehicle body portion, comprising:

a vehicle body structural member;

an interior trim spaced from the structural member by an interval extending inward from the structural member; and an energy absorbing member disposed in the interval between the structural member and the interior trim, wherein the energy absorbing member is a hybrid pipe having a metal foil core member and sheets laminated on opposite surfaces of the core member, each sheet being formed from a material other than metal, the core member and the sheets on the opposite surfaces of the core member are shaped so that the hybrid pipe has protruded portions and recessed portions that are contiguous in a direction of an axis of the hybrid pipe, at least one of an outer peripheral surface of the hybrid pipe and an inner peripheral surface of the hybrid pipe is at least partially coated with an adhesive coating material to form a partially coated surface, and the protruded portions are adhered to each other by the adhesive coating material.

2. An impact energy absorbing structure according to claim 1, wherein the partially coated surface is coated with the adhesive coating material in accordance with a predetermined energy absorbing characteristic.

3. An impact energy absorbing structure according to claim 1, wherein a layer thickness of the adhesive coating material is partially varied in accordance with a predetermined energy absorbing characteristic.

4. An impact energy absorbing structure according to claim 1, wherein the core member is formed from one of an aluminum foil, a stainless steel foil and a magnesium alloy foil, the sheets are formed from paper, the coating material is made of a resin selected from a group at least consisting of acrylic resins and epoxy resins, and the coating material is provided on the outer peripheral surface of the hybrid pipe.

5. An impact energy absorbing structure according to claim 1, wherein the structural member is formed by a pillar and a roof side rail, and the coating material is provided on the hybrid pipe so that the coating material is positioned at an intersecting portion between the pillar and the roof side rail.

6. An impact energy absorbing structure according to claim 1, wherein the hybrid pipe has a plurality of portions of the partially coated surface that are coated with the adhesive coating material that are spaced from adjacent coated portions by a predetermined interval in the direction of the axis of the hybrid pipe.

7. An impact energy absorbing structure according to claim 6, wherein a slit is formed at one or both of a boundary between a portion of the hybrid pipe coated with the coating material and a portion of the hybrid pipe not coated with the coating material and a boundary between a portion of the hybrid pipe coated with the coating material to one thickness and a portion of the hybrid pipe coated with the coating material to another thickness that is different from said one thickness.

8. An impact energy absorbing structure according to claim 7, wherein the hybrid pipe has a polygonal sectional shape, and the at least one slit is formed in a generally flat face portion apart from a corner portion of the hybrid pipe.

9. An impact energy absorbing structure according to claim 1, wherein at least one of an outer peripheral surface of an intermediate portion of the hybrid pipe and an inner peripheral surface of the intermediate portion of the hybrid pipe is coated with an adhesive coating material so that a hardness of the intermediate portion in the direction of the axis varies relative to non-coated portions.

10. An impact energy absorbing structure in an upper vehicle body portion according to claim 9, wherein at least one slit is formed at a boundary between portions differing from each other in hardness.

11. An impact energy absorbing member comprising:
a metal foil core member; and
sheets laminated on opposite surfaces of the core member, each sheet being formed from a material other than metal,
wherein the core member and the sheets on the opposite surfaces of the core member form a hybrid pipe and are shaped so that the energy absorbing member has protruded portions and recessed portions that are contiguous in a direction of an axis of the hybrid pipe, at least one of an outer peripheral surface of the energy absorbing member and an inner peripheral surface of the energy absorbing member is at least partially coated with an adhesive coating material to form a partially coated surface, and the protruded portions are adhered to each other by the adhesive coating material.

12. An impact energy absorbing member according to claim 11, wherein the core member is formed from one of an aluminum foil, a stainless steel foil and a magnesium alloy foil, the sheets are formed from paper, the coating material is made of a resin selected from a group at least consisting of acrylic resins and epoxy resins, and the coating material is provided on the outer peripheral surface of the energy absorbing member.

13. An impact energy absorbing structure in an upper vehicle body portion, comprising:
a vehicle body structural member;
an interior trim spaced from the structural member by an interval extending inward from the structural member; and
an energy absorbing member disposed in the interval between the structural member and the interior trim,
wherein the energy absorbing member is a hybrid pipe having a metal foil core member and sheets laminated on opposite surfaces of the core member, each sheet being formed from a material other than metal, and the core member and the sheets on the opposite surfaces of the core member are shaped so that the hybrid pipe has protruded portions and recessed portions that are contiguous in a direction of an axis of the hybrid pipe, the hybrid pipe being bent so as to substantially conform to a shape of the structural member, and the hybrid pipe being subjected to one of a strengthening process of a small-curvature portion of a bent portion of the hybrid pipe and a weakening process of a large-curvature portion of the bent portion of hybrid pipe.

14. An impact energy absorbing structure according to claim 13, wherein the small-curvature portion is coated with an adhesive coating material.

15. An impact energy absorbing structure according to claim 13, wherein the large-curvature portion has at least one slit.

16. An impact energy absorbing member comprising:
a metal foil core member; and
sheets laminated on opposite surfaces of the core member, each sheet being formed from a material other than metal,
wherein the core member and the sheets on the opposite surfaces of the core member are shaped so that the energy absorbing member has protruded portions and recessed portions that are contiguous in a direction of an axis of the hybrid pipe, the energy absorbing member being bent so as to substantially conform to a shape of the structural member, and the energy absorbing member being subjected to one of a strengthening process of a small-curvature portion of a bent portion of the energy absorbing member and a weakening process of a large-curvature portion of the bent portion of the energy absorbing member.

17. An impact energy absorbing member according to claim 16, wherein the small-curvature portion is coated with an adhesive coating material.

18. An impact energy absorbing member according to claim 16, wherein the large-curvature portion has at least one slit.

* * * * *